United States Patent
Kim

(10) Patent No.: US 9,824,261 B2
(45) Date of Patent: Nov. 21, 2017

(54) METHOD OF FACE DETECTION, METHOD OF IMAGE PROCESSING, FACE DETECTION DEVICE AND ELECTRONIC SYSTEM INCLUDING THE SAME

(71) Applicant: SAMSUNG ELECTRONICS CO., LTD., Suwon-si (KR)

(72) Inventor: Eung-Joo Kim, Gwacheon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/973,953

(22) Filed: Dec. 18, 2015

(65) Prior Publication Data

US 2016/0188963 A1    Jun. 30, 2016

(30) Foreign Application Priority Data

Dec. 24, 2014    (KR) .................. 10-2014-0187831

(51) Int. Cl.
  *G06K 9/00* (2006.01)
  *H04N 5/232* (2006.01)

(52) U.S. Cl.
  CPC ..... *G06K 9/00228* (2013.01); *H04N 5/23212* (2013.01); *H04N 5/23219* (2013.01)

(58) Field of Classification Search
  CPC .......... G06K 9/00288; G06K 9/00255; G06K 9/00221; G06K 9/6206; G06T 3/40; G06T 7/0042
  USPC ....................................................... 382/118
  See application file for complete search history.

(56) References Cited

U.S. PATENT DOCUMENTS

| | | | |
|---|---|---|---|
| 7,949,244 B2 | 5/2011 | Huang | |
| 7,969,481 B2 | 6/2011 | Kikuchi | |
| 8,068,164 B2 | 11/2011 | Kumagai et al. | |
| 8,363,983 B2 | 1/2013 | Jeon et al. | |
| 8,437,553 B2 | 5/2013 | Washida | |
| 8,559,707 B2 | 10/2013 | Wu | |
| 8,570,429 B2 | 10/2013 | Park et al. | |
| 9,047,504 B1 * | 6/2015 | Ramaswamy | ..... G06K 9/00228 |
| 2013/0070116 A1 | 3/2013 | Suzuki et al. | |

FOREIGN PATENT DOCUMENTS

| | | | |
|---|---|---|---|
| JP | 4126721 B2 | 7/2008 | |
| JP | 5100621 B2 | 12/2012 | |

OTHER PUBLICATIONS

Yamamoto, an English machine translation of JP2010-117489, 2010.*

* cited by examiner

*Primary Examiner* — Ruiping Li
(74) *Attorney, Agent, or Firm* — Sughrue Mion, PLLC

(57) ABSTRACT

A method of face detection to be performed by an apparatus including an image pickup module includes: obtaining a first image including image information of an object that is in focus; obtaining a pseudo distance between the image pickup module and the object when the first image is obtained by the obtaining; determining a first ratio of a plurality of ratios as a scaling value based on the pseudo distance; and performing face detection of the first image by changing the scaling value based on the first ratio.

20 Claims, 24 Drawing Sheets

FIG. 8

| DSPR \ LP | L1 | L2 | L3 | L4 | L5 | L6 | L7 | L8 | L9 | L10 | L11 | L12 | ... |
|---|---|---|---|---|---|---|---|---|---|---|---|---|---|
| +5 | SL2 | SL2 | SL2 | SL2 | SL2 | SL2 | SL3 | SL3 | SL3 | SL3 | SL3 | SL3 | ... |
| +4 | SL2 | SL2 | SL2 | SL2 | SL2 | SL2 | SL2 | SL2 | SL3 | SL3 | SL3 | SL3 | ... |
| +3 | SL1 | SL1 | SL2 | SL2 | SL2 | SL2 | SL2 | SL2 | SL2 | SL3 | SL3 | SL3 | ... |
| +2 | SL1 | SL1 | SL1 | SL1 | SL2 | SL2 | SL2 | SL2 | SL2 | SL2 | SL3 | SL3 | ... |
| +1 | SL1 | SL1 | SL1 | SL1 | SL1 | SL1 | SL2 | SL1 | SL2 | SL2 | SL2 | SL2 | ... |
| 0 | SL1 | SL1 | SL1 | SL1 | SL1 | SL1 | SL1 | SL1 | SL2 | SL2 | SL2 | SL2 | ... |
| -1 | SL1 | SL1 | SL1 | SL1 | SL1 | SL1 | SL1 | SL1 | SL1 | SL1 | SL2 | SL2 | ... |
| -2 | SL1 | SL1 | SL1 | SL1 | SL1 | SL1 | SL1 | SL1 | SL1 | SL1 | SL1 | SL2 | ... |
| -3 | SL1 | SL1 | SL1 | SL1 | SL1 | SL1 | SL1 | SL1 | SL1 | SL1 | SL1 | SL1 | ... |
| -4 | SL1 | SL1 | SL1 | SL1 | SL1 | SL1 | SL1 | SL1 | SL1 | SL1 | SL1 | SL1 | ... |
| -5 | SL1 | SL1 | SL1 | SL1 | SL1 | SL1 | SL1 | SL1 | SL1 | SL1 | SL1 | SL1 | ... |

METHOD OF FACE DETECTION, METHOD OF IMAGE PROCESSING, FACE DETECTION DEVICE AND ELECTRONIC SYSTEM INCLUDING THE SAME

CROSS-REFERENCE TO RELATED APPLICATION

This application claims priority under 35 U.S.C. §119 to Korean Patent Application 10-2014-0187831 filed on Dec. 24, 2014 in the Korean Patent Office, the subject matter of which is hereby incorporated by reference in its entirety.

BACKGROUND

The exemplary embodiments relate to image processing, and more particularly, to a method of face detection of an image, a method of image processing based on a result of the face detection, a face detection device and an electronic system including the face detection device.

Image recording devices have been adopted in various electronic systems and mobile systems. Recently, research on an image recording device which can obtain distance information of an object as well as image information of the object has been conducted. The image which is recorded by the image recording device can be processed in various ways. For example, face information in the recorded image can be detected. Researchers are conducting various research projects on techniques of detecting the face information in a recorded image.

SUMMARY

According to an aspect of an exemplary embodiment, there is provided a method of face detection to be performed by an apparatus including an image pickup module, the method including obtaining a first image including image information of an object that is in focus, obtaining a pseudo distance between the image pickup module and the object when the first image is obtained by the obtaining, determining a first ratio of a plurality of ratios as a scaling value based on the pseudo distance, and performing face detection of the first image by changing the scaling value based on the first ratio.

The obtaining the pseudo distance may include obtaining distance information of the object, detecting a position of a lens included in the image pickup module, and calculating the pseudo distance based on the distance information and the position of the lens.

The distance information may include a disparity value corresponding to a phase difference between a first object image that is incident on a first part of the lens and a second object image that is incident on a second part of the lens.

The image pickup module may be configured to obtain first data corresponding to the distance information and the first image including the image information of the object.

The determining the first ratio as the scaling value may include calculating an expected face size of the first image based on the pseudo distance, a field of view of the image pickup module and a reference face size, calculating an expected ratio which is a size ratio of the expected face size to a reference window of a face classifier, and selecting, as the scaling value, the first ratio of the plurality of ratios which is closest to the expected ratio.

The method of face detection may further include obtaining a second image after performing face detection of the first image, determining a second ratio of the plurality of ratios as the scaling value, the second ratio being different from the first ratio, and performing face detection of the second image by changing the scaling value based on the second ratio.

The performing face detection may include obtaining a second image by scaling the first image based on the scaling value having the first ratio, analyzing the second image by using a face classifier, and completing the analyzing of the second image when a face region corresponding to a reference window of the face classifier is detected as a result of the analyzing of the second image by using the face classifier.

The performing face detection further may include changing the scaling value to be a second ratio of the plurality of ratios, the second ratio being closest to the first ratio, when the face region is not detected as a result of the analyzing of the second image by using the face classifier, obtaining a third image by scaling the first image based on the scaling value having the second ratio, and analyzing the third image by using the face classifier.

The performing face detection may include scaling a reference window of a face classifier based on the scaling value having the first ratio, analyzing the first image based on the scaled reference window of the face classifier, and completing the analyzing of the first image when a face region corresponding to the scaled reference window of the face classifier is detected as a result of the analyzing of the first image.

The operations of the obtaining the pseudo distance, the determining the first ratio of a plurality of ratios as the scaling value, and the performing face detection may be performed by a data processing module that is separate from the image pickup module.

According to an aspect of an exemplary embodiment, there is provided a method of image processing including obtaining, by an image pickup module, a first image including image information of an object that is out of focus, obtaining a pseudo distance between the image pickup module and the object, determining a first ratio as a scaling value based on the pseudo distance, performing face detection of the first image by changing the scaling value based on the first ratio, obtaining, by the image pickup module, a second image including image information of the object that is in focus, and performing data processing of a first region of the second image corresponding to a face region of the first image, the face region being obtained by the face detection operation.

According to an aspect of an exemplary embodiment, there is provided a face detection device including an image pickup module configured to obtain a first image including image information of an object that is out of focus, and a data processing module configured to obtain a pseudo distance between the image pickup module and the object, determine a first ratio of a plurality of ratios as a scaling value based on the pseudo distance, and perform face detection of the first image by changing the scaling value based on the first ratio.

The data processing module may include a calculator configured to obtain distance information of the object, an estimator configured to obtain a position of a lens of the pickup module, generate the pseudo distance based on the distance information and the position of the lens, and determine the scaling value based on the pseudo distance, and a detector configured to perform face detection of the first image based on the scaling value.

The distance information may include a disparity value corresponding to a phase difference between a first object image that is incident on a first part of the lens and a second object image that is incident on a second part of the lens, and the estimator comprises a lookup table associating the scaling value with the pseudo distance, and the estimator may be configured to determine the scaling value based on the pseudo distance.

The detector may include a scaler configured to obtain a second image by scaling the first image based on the scaling value, and an image analyzer configured to perform an analysis of the second image based on a face classifier.

When a face region corresponding to a reference window of the face classifier is not detected as a result of the analysis of the second image, the estimator may be configured to change the scaling value to be a second ratio of the plurality of ratios which is closest to the first ratio, and wherein the scaler may be configured to obtain a third image by scaling the first image based on the scaling value having the second ratio, and the image analyzer is configured to analyze the third image based on the face classifier.

The detector may include a scaler configured to scale a reference window of a classifier based on the scaling value having the first ratio, and an image analyzer configured to analyze the first image based on the scaled reference window of the classifier.

The image pickup module may be configured to obtain first data corresponding to the distance information and the first image including the image information of the object.

The face detection device may further include a distance measurement module configured to obtain first data corresponding to the distance information, wherein the calculator is configured to obtain the distance information based on the first data received from the distance measurement module.

The data processing module may further include a controller configured to generate a first control signal based on the distance information, and wherein the pickup module further comprises a motor configured to control the position of the lens based on the first control signal.

According to an aspect of an exemplary embodiment, there is provided an electronic system comprising a processor, and a face detection device controlled by the processor, the face detection device being configured to perform face detection of a first image including image information of an object that is out of focus, wherein the face detection device comprises an image pickup module configured to obtain the first image, and a data processing module configured to obtain a pseudo distance between an image pickup module and the object, and determine a first ratio of a plurality of ratios as a scaling value based on the pseudo distance, and perform face detection of the first image by changing the scaling value based on the first ratio.

The image pickup module may be configured to obtain a second image including image information of the object when the object is in focus, and the processor may be configured to perform data processing of a first region of the second image corresponding to a face region of the first image obtained by the face detection performed by the data processing module.

The data processing module may be implemented in the processor.

The electronic system may be implemented as a mobile device such as a mobile phone, a smart phone, a personal digital assistant (PDA), a portable multimedia player (PMP), a digital camera, a camcorder, a music player, a portable game console, a navigation system, etc.

According to as aspect of an exemplary embodiment, there is provided an image pickup apparatus comprising a lens configured to focus light reflected from an object, a sensor configured to obtain an image based on the focused light, a motor configured to move the lens to thereby perform an autofocusing operation to focus the image when the image is obtained and a data processor configured to detect a face image in the image before the autofocusing operation is completed.

The data processor is configured to detect the face image based on a pseudo distance between the lens and the object. The data processor is configured to determine a scaling value based on the pseudo distance, scale the image based on the scaling value, and detect the face image based on the scaled image.

BRIEF DESCRIPTION OF THE DRAWINGS

The above and other aspects will become more apparent by describing in detail exemplary embodiments with reference to the accompanying drawings in which:

FIGS. 8 and 9 are conceptual diagrams illustrating procedures to obtain the pseudo distance and determine the scaling value described in FIG. 2;

DETAILED DESCRIPTION OF EXEMPLARY EMBODIMENTS

Figure 1:
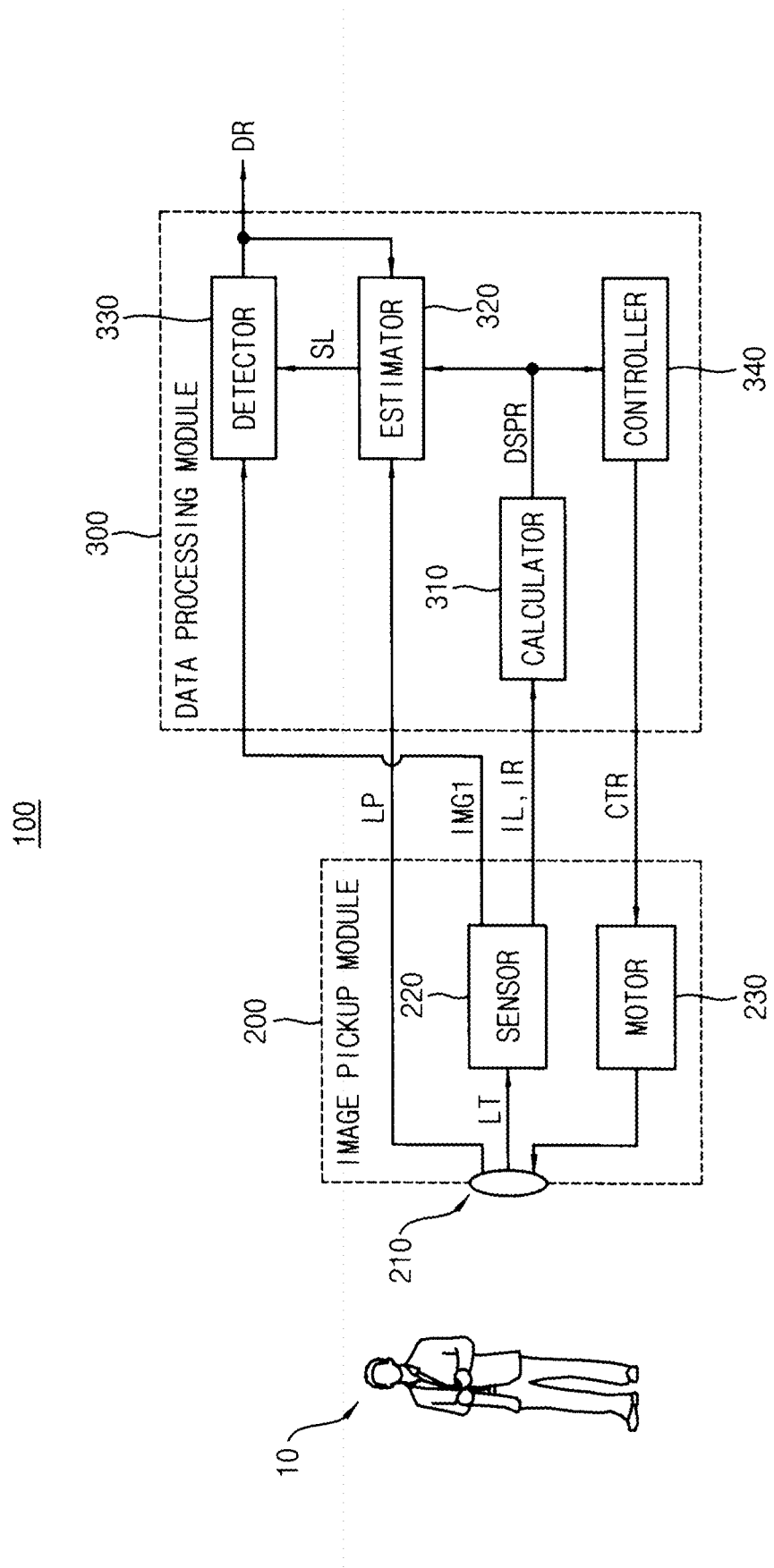
FIG. 1 is a block diagram of a face detection device according to an exemplary embodiment.

Various exemplary embodiments will now be described more fully hereinafter with reference to the accompanying drawings, in which exemplary embodiments are shown. The exemplary embodiments may, however, be embodied in different forms and should not be construed as being limited to the exemplary embodiments set forth herein. Rather, these exemplary embodiments are provided so that this disclosure will be thorough and complete, and will fully convey the scope of the exemplary embodiments to those skilled in the art. The same reference numbers may indicate the same components throughout the specification. In the attached figures, the thickness of layers and regions may be exaggerated for clarity.

It will also be understood that when a layer is referred to as being "on" another layer or substrate, the layer can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the exemplary embodiments, especially in the context of the following claims, are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted.

Unless defined otherwise, all technical and scientific terms used herein have the same meaning as commonly understood by one of ordinary skill in the art to which the exemplary embodiments belong. It is noted that the use of any and all examples, or exemplary terms provided herein, is intended merely to better illuminate the exemplary embodiments and is not a limitation on the scope of the exemplary embodiments unless otherwise specified. Further, unless defined otherwise, all terms defined in generally used dictionaries may not be overly interpreted.

The exemplary embodiments will be described with reference to perspective views, cross-sectional views, and/or plan views. Thus, the profile of an exemplary view may be modified according to manufacturing techniques and/or allowances. That is, the exemplary embodiments are not intended to limit the scope of the exemplary embodiments but cover all changes and modifications that can be caused due to a change in a manufacturing process. Thus, regions shown in the drawings are illustrated in schematic form and the shapes of the regions are presented simply by way of illustration and not as a limitation.

Various exemplary embodiments will be described more fully hereinafter with reference to the accompanying drawings.

FIG. 1 is a block diagram of a face detection device according to an exemplary embodiment. Referring to FIG. 1, a face detection device 100 may include an image pickup module 200 and a data processing module 300.

The image pickup module 200 may obtain an image including an object 10 which is a subject for the photograph. For example, the image pickup module 200 may obtain a first image IMG1 including image information of an unfocused object 10.

The image pickup module 200 may include a lens 210. The image pickup module 200 may further include a sensor 220 and a motor 230.

The lens 210 may concentrate an external light signal LT on the sensor 220. The external light signal LT may include a visible light signal, an infrared light signal and/or near-infrared light signal. Although the image pickup module 200 in FIG. 1 shows a lens 210, the image pickup module 200 may include two or more than two lenses according to an exemplary embodiment.

The sensor 220 may obtain the first image IMG1 based on the external light signal LT. As described above, the first image IMG1 may be an unfocused image before a focusing operation, and as an unfocused image, may include blurred image information of the object 10.

In addition, based on the light signal LT, the sensor 220 may obtain first data (IL and IR) which corresponds to distance information DSPR to the object 10 from the lens 210. The first data (IL and IR) may include a first object image IL and a second object image IR. The sensor 220 may obtain the distance information DSPR based on the first data (IL and IR) when the sensor obtains the first image IMG1.

According to an exemplary embodiment, the sensor 220 may be an image sensor, although is not limited thereto. The sensor 220 may obtain the first data (IL and IR) corresponding to the distance information DSPR, together with the first image IMG1 including the image information of the object 10, at substantially the same time (e.g., simultaneously when the first image IMG1 is obtained). For, example, the sensor 220 may be an RGBZ sensor. Hereafter, the sensor 220 will be exemplarily described as a Complementary Metal Oxide Semiconductor (CMOS) image sensor, but it not limited thereto. The sensor 220 may be one of various types of image sensors, such as a Charged Coupled Device (CCD) image sensor.

The motor 230 may control a position of the lens 210 based on a control signal CTR received from the data processing module 300. For example, the motor 230 may be a voice coil motor (VCM).

The image pickup module 200 may generate a first signal LP which indicates a position of the lens 210, e.g., the current position of the lens 210.

After the image pickup module 200 obtains the first image IMG1, the image pickup module 200 may obtain a second image (not shown in FIG. 1) which includes image information of the object 10 that is in focus. This feature will be described in detail later in FIG. 19.

The data processing module 300 may determine a pseudo distance between the object 10 and the lens 210 (or the image pickup module 200) when the first image IMG1 is obtained, determine a first ratio of a plurality of ratios as a scaling value SL for detecting a face based on the pseudo distance, and perform face detection of the first image IMG1 by selectively changing the scaling value SL based on the first ratio. The pseudo distance may be an expected distance between the object 10 and the lens 210 which is determined when the first image is obtained.

The data processing module 300 may include a calculator 310, an estimator 320, and a detector 330. The data processing module 300 may further include a controller 340.

The calculator 310 may generate the distance information DSPR of the object 10 based on the first data (IL and IR) when the first image IMG1 is obtained.

The distance information DSPR may include a disparity value corresponding to a phase difference between a first object image IL and a second object image IR. The first object image IL is incident on a first part of the lens 210, e.g., left side of the lens 210, and the second object image IR is incident on a second part of the lens 210, e.g., right side of the lens 210. This feature will be described in detail referring to FIGS. 4A, 4B and 4C.

The estimator 320 may receive from the image pickup module 200 the first signal LP which indicates the current position of the lens 210 when the image pickup module 200 obtains the first image IMG1. The estimator 320 may calculate the pseudo distance based on the distance information DSPR and the position of the lens 210 and may determine the scaling value SL based on the pseudo distance.

The estimator 320 may change the scaling value SL by selecting one of values stored in a lookup table based on a detection signal DR. The lookup table will be described in detail later referring to FIGS. 8 and 9.

The detector 330 may perform face detection of the first image IMG1 based on the scaling value SL, and may generate the detection signal DR which indicates a face detection result.

Structures and operations of the calculator 310, the estimator 320 and the detector 330 will be described in detail later referring to FIGS. 3 through 15.

The controller 340 may generate a control signal CTR to control the position of the lens 210 based on the distance information DSPR. The image pickup module 200 may perform an auto-focusing operation based on the control signal CTR.

According to an exemplary embodiment, the data processing module 300 may be a processing unit (e.g., processor) such as a central processing unit (CPU), a microprocessor, an application processor (AP), etc. According to some exemplary embodiments, the data processing module 300 may be embodied in the processing unit, or may be implemented separately from the processing unit.

Although an image pickup module 200 is described in FIG. 1 to obtain the first data (IL and IR) corresponding to the distance information DSPR and the first image IMG1 including the image information of the object 10 together, there may be separate image pickup modules each of which obtains the first data (IL and IR) corresponding to the distance information DSPR and obtains the first image IMG1 including the image information of the object 10, respectively. The separate pickup modules will be described in detail referring to FIG. 17.

Figure 2:
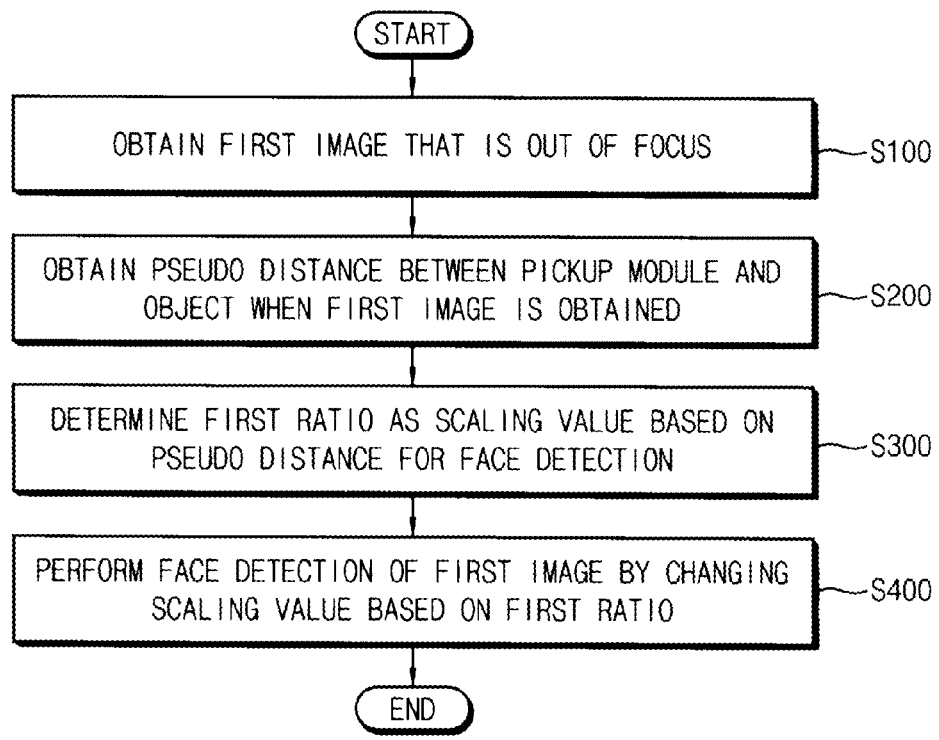
FIG. 2 is a flow chart illustrating a method of face detection.

FIG. 2 is a flow chart illustrating a method of face detection. Referring to FIGS. 1 and 2, a method of face detection may include obtaining a first image IMG1 by the image pickup module 200 in operation S100. The first image IMG1 may be an image which includes unfocused image information of an object 10.

In operation S200, first data which corresponds to a pseudo distance between the object 10 and the image pickup module 200 may be obtained when the first image IMG1 is obtained. According to an exemplary embodiment, the term "pseudo distance" denotes an expected distance between a face of the object 10 and the lens 210 which may be determined when the first image is obtained.

A first ratio as a scaling value SL based on a plurality of ratios for detecting a face may be determined based on the pseudo distance in operation S300. The first ratio may be an initial value of the scaling value SL. A face detection of the first image IMG1 may be performed by changing the scaling value SL based on the first ratio in operation S400. The scaling value SL may be used to change a size of the first image IMG1 for the face detection.

According to an exemplary embodiment that will be described in detail later with reference to FIG. 10, a scaling operation, for example, a down-scaling operation, of the first image IMG1 may be performed based on the scaling value SL and a face detection may be performed based on the scaled image.

According to another exemplary embodiment that will be described in detail later with reference to FIG. 14, a scaling operation, for example, an up-scaling operation, of a reference window of a face classifier may be performed based on the scaling value SL and a face detection may be performed based on the scaled reference window of the face classifier.

According to an exemplary embodiment, when a face region which corresponds to the reference window of the face classifier is detected based on the scaling value SL, the face detection may be completed. When the face region corresponding to the reference window of the face classifier is not detected based on the scaling value SL of the first ratio, the scaling value SL may be changed to be a second ratio of the plurality of ratios. The second ratio may be a closest ratio to the first ratio in the plurality of ratios.

The data processing module 300 may perform the operations in operations S200, S300 and S400. Alternatively, another device different from the data processing module 300 may also perform the operation in operations S200, S300 and S400.

Figure 3:
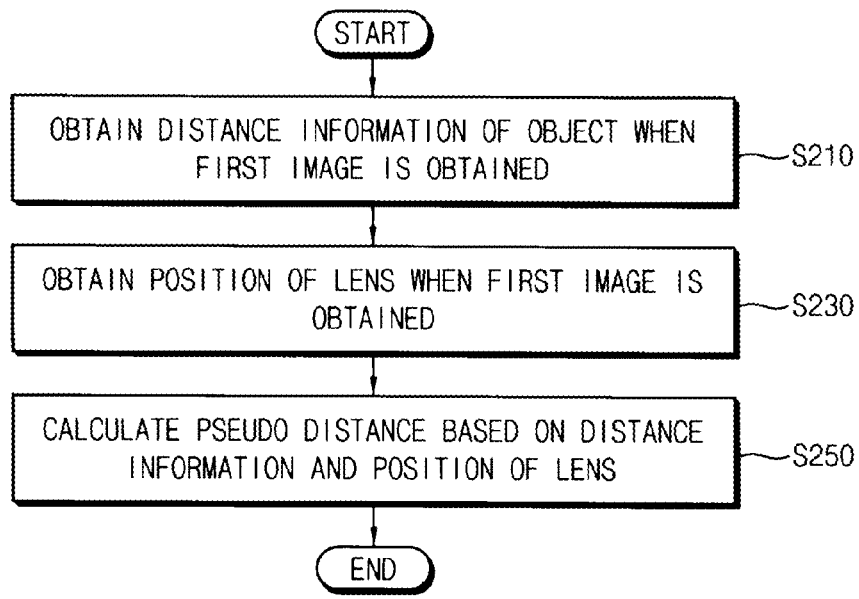
FIG. 3 is a flow chart illustrating a procedure to obtain a pseudo distance shown in FIG. 2.

FIG. 3 is a flow chart illustrating a procedure to obtain a pseudo distance shown in FIG. 2. Referring to FIGS. 1, 2 and 3, a method of obtaining a pseudo distance in operation S200 may comprise extracting distance information DSPR of the object 10 when the first image IMG1 is obtained in operation S210. The distance information DSPR may include a disparity value corresponding to a phase difference between a first object image IL and a second object image IR. The first object image IL is incident on a first part of the lens 210, e.g., left side of the lens 210, and the second object image IR is incident on a second part of the lens 210, e.g., right side of the lens 210.

In operation S230, the position of the lens 210 may be detected when the first image IMG1 is obtained. For example, the position of the lens 210 may be detected based on the first signal LP received from the image pickup module 200 when the first IMG1 is obtained.

The pseudo distance may be calculated based on the distance information DSPR and the position of the lens 210 in operation S250.

Figure 4A:
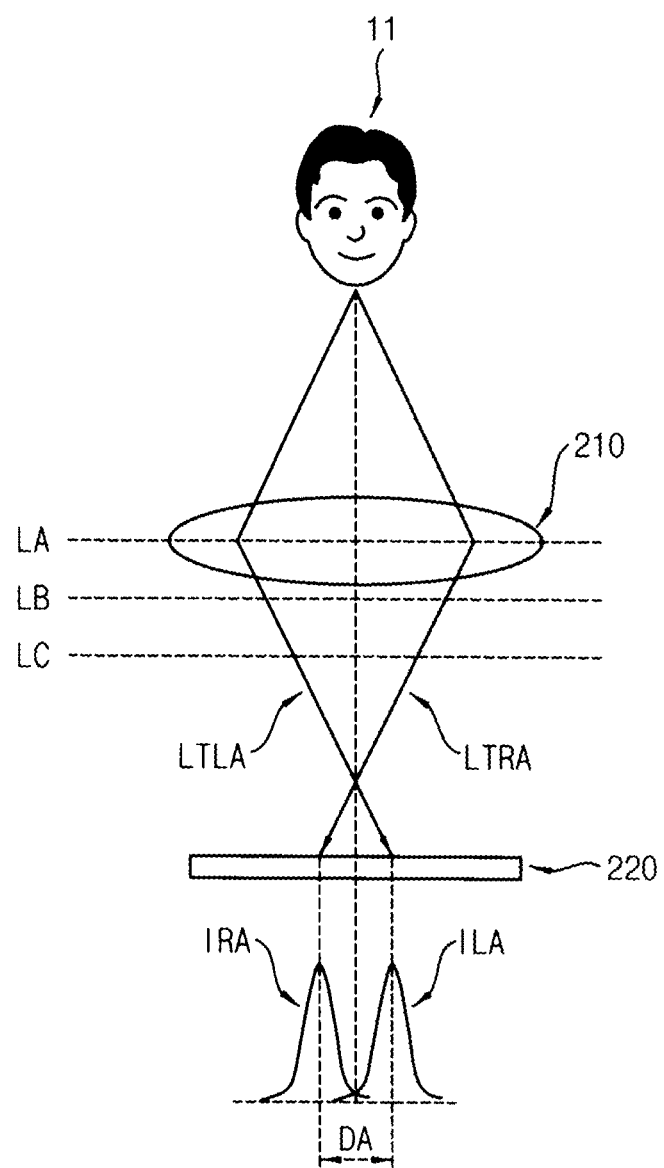
FIGS. 4A, 4B, and 4C are conceptual diagrams illustrating a procedure to obtain the pseudo distance of an object described in FIG. 3.
Figure 4B:
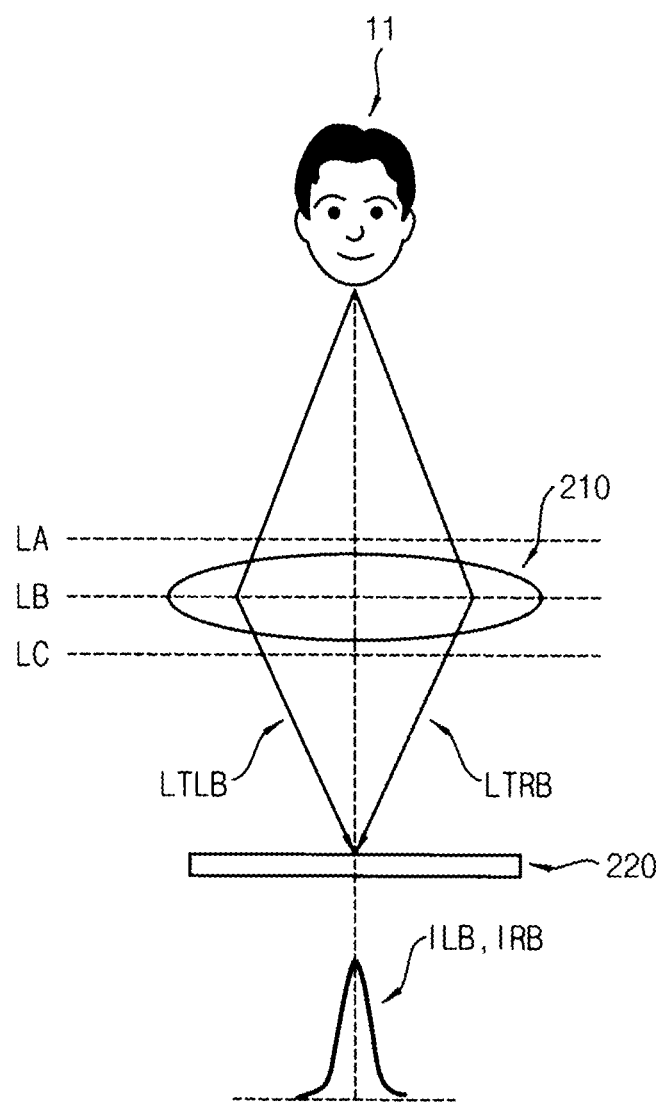
Figure 4C:
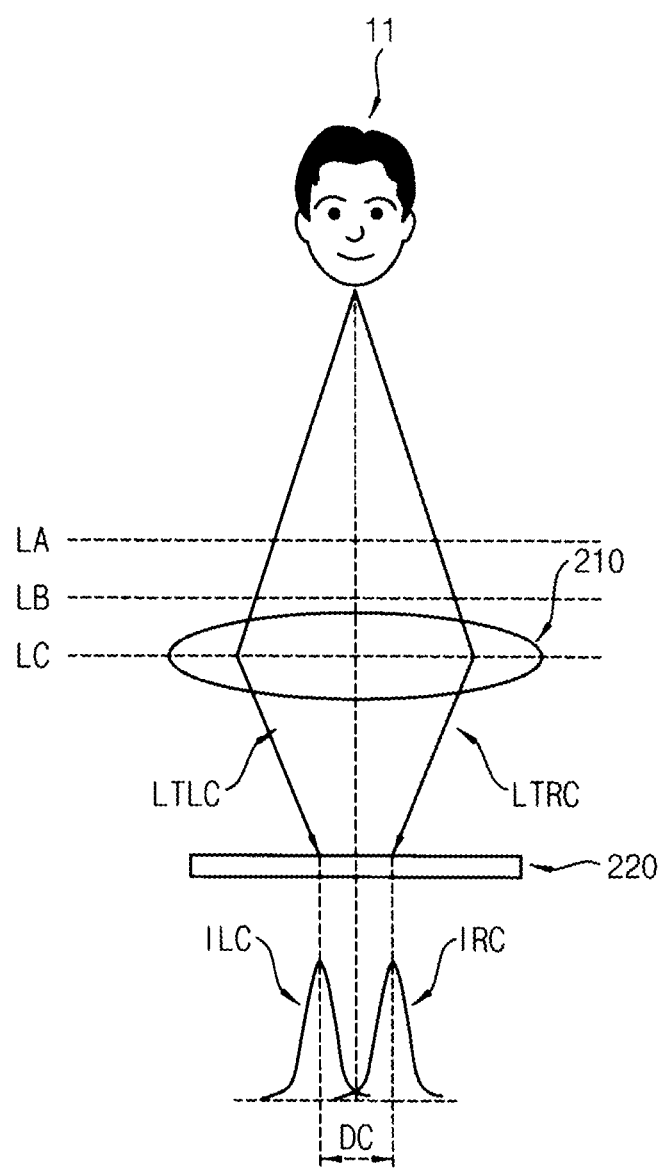

FIGS. 4A, 4B and 4C are conceptual diagrams illustrating a procedure to obtain the pseudo distance to an object described in FIG. 3. Specifically, FIGS. 4A, 4B and 4C are conceptual diagrams to explain concepts of the disparity value. The disparity value may correspond to a phase difference between the first object image IL and the second object image IR and may be a given number based on the phase difference. To conveniently illustrate certain exemplary features, FIGS. 4A, 4B and 4C include only a face 11 of the object 10 which is a subject for the photograph.

Referring to FIG. 4A, the distance between the lens 210 and the sensor 220 may be too long so that the obtained image may be out of focus. Here, when the position of lens 210 is at the first position LA, the sensor 220 may obtain a first object image ILA based on a light LTLA that is incident on a first part, e.g., a left part, of the lens 210 and a second object image IRA based on a light LTRA that is incident on a second part, e.g., a right part, of the lens 210. The first object image ILA and the second object image IRA may not be coincident with each other such that the face 11 may be out of focus by an amount of a first phase difference DA. In other words, a binocular parallax between the two object images ILA and IRA may exist. As shown in FIG. 4A, when the first object image ILA is located relatively in the right side and the second object image IRA is located relatively in the left side, the disparity value may be a positive integer number, e.g., a positive disparity by a front-focus. An absolute value of the disparity value may increase as the first phase difference DA between the first object image ILA and the second object image IRA increases.

Referring to FIG. 4B, the distance between the lens 210 and the sensor 220 may be accurate so that the obtained image may be in focus. Here, when the position of lens 210 is at the second position LB which is closer to the sensor 220 than the first position LA, the sensor 220 may obtain a first object image ILB based on a light LTLA that is incident on the first part, e.g., the left part, of the lens 210 and a second object image IRB based on a light LTRA that is incident on the second part, e.g., the right part, of the lens 210. The first object image ILB and the second object image IRB may be coincident with each other such that there may be no binocular parallax between the two images ILB and IRB and the face 11 may be in focus. As shown in FIG. 4B, when the first object image ILB is coincident with the second object image IRB, the disparity value may be zero, e.g., a zero disparity by in-focus.

Referring to FIG. 4C, the distance between the lens 210 and the sensor 220 may be too close so that the obtained image may be out of focus. Here, when the position of lens 210 is at the third position LC which is closer to the sensor 220 than the second position LB, the sensor 220 may obtain a first object image ILC based on a light LTLA that is incident on a first part, e.g., a left part, of the lens 210 and a second object image IRA based on a light LTRA that is incident on a second part, e.g., a right part, of the lens 210. The first object image ILC and the second object image IRC may not be coincident with each other such that the face 11 may be out of focus by an amount of a second phase difference DC. In other words, a binocular parallax between the two object images ILC and IRC may exist. As shown in FIG. 4C, when the first object image ILC is located relatively in the left side and the second object image IRC is located relatively in the right side, the disparity value may be a negative integer number, e.g., a negative disparity by a back-focus. An absolute value of the disparity value may increase as the second phase difference DC between the first object image ILA and the second object image IRA increases.

As described above, the disparity value may be one of positive integer numbers, zero and negative integer numbers. If the disparity value is a positive integer value, the distance between the lens 210 and the sensor 220 may be relatively distant from a focal point. If the disparity value is a negative integer value, the distance between the lens 210 and the sensor 220 may be relatively insufficient to the focal point. If the disparity value is zero, the distance between the lens 210 and the sensor 220 may be accurate so that the obtained image of the object 10 may be in focus. As an absolute value of the disparity value may increase, the obtained image of the object 10 may be increasingly out of focus.

Although FIGS. 4A, 4B and 4C illustrate a method of obtaining a disparity value using one lens 210 according to an exemplary embodiment, a plurality of lenses may be used for obtaining the disparity value.

According to an exemplary embodiment, the image pickup module 200 may include the plurality of lenses to obtain an image of the object 10 by a stereoscopic method. Here, the disparity value may be obtained based on a phase difference between a first object image that is incident from a first lens and a second object image that is incident from a second lens.

According to another exemplary embodiment, the image pickup module 200 may include the plurality of lenses to obtain an image of the object 10 by a light-field or a plenoptic method. Here, the disparity value may be obtained based on a phase difference among a plurality of object images that are incident from the plurality of lenses.

The face detection device 100 may perform an auto-focusing operation based on the disparity value mentioned above. For example, as described with reference to FIG. 4A, the controller 340 in FIG. 1 may generate a control signal CTR to decrease the distance between the lens 210 and the sensor 220 when the disparity value is a positive integer number. On the other hand, as described with reference to FIG. 4C, the controller 340 in FIG. 1 may generate a control signal CTR to increase the distance between the lens 210 and the sensor 220 when the disparity value is a negative integer number.

Figure 5:
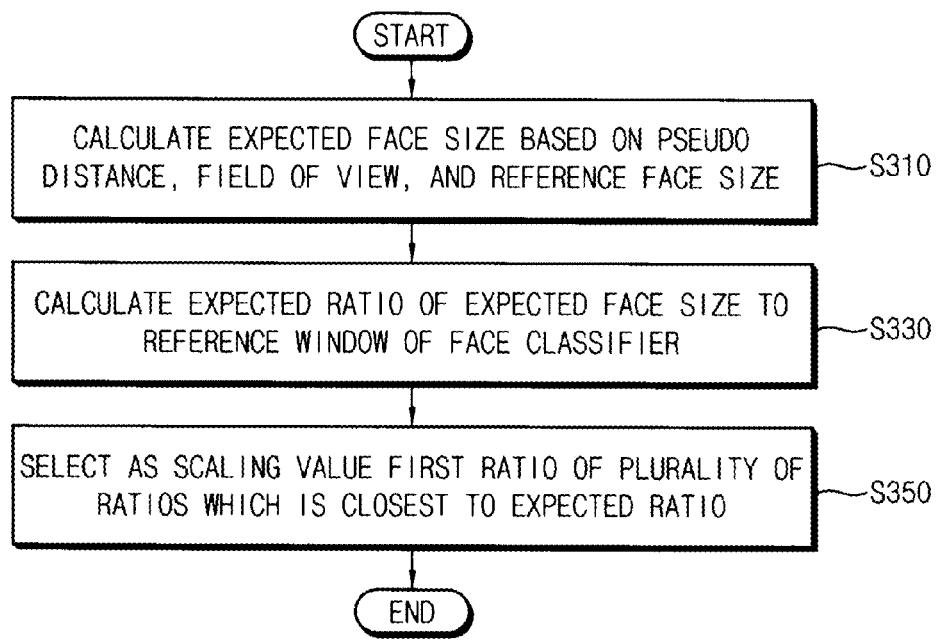
FIG. 5 is a flow chart illustrating a procedure to determine a scaling value described in FIG. 2.

FIG. 5 is a flow chart illustrating a procedure to determine a scaling value described in FIG. 2.

Referring to FIGS. 1, 2 and 5, when the scaling value SL is determined to be a first ratio in operation S300, an expected face size that can be included in the first image may be calculated based on the pseudo distance, a field of view (FOV) of the image pickup module 200 and a reference face size in operation S310. A scene size captured by the pickup module 200 may be determined based on the field of view (FOV) of the image pickup module 200. The reference face size is a standard face size of a human being and may be between about 17 cm to 21 cm. Accordingly, when the field of view (FOV) and the reference face size are predetermined, the face size obtained by the sensor 220 may be expected based on the pseudo distance.

In operation S330, an expected ratio may be calculated, which is a size ratio of the expected face size to the reference window of a face classifier. The face classifier may include information and/or data for detecting a face. The face classifier will be described in detail in FIG. 7.

According to an exemplary embodiment, a method of face detection by the reference window with a fixed size of the face classifier will be described with reference to FIG. 10. In addition, a method of face detection by the reference window with a variable size of the face classifier will be described with reference to FIG. 10. The expected ratio may an initial size ratio of the expected face size to the reference window of the face classifier, when a face detection operation is performed by changing the size of the reference window of the face classifier.

A first ratio of the plurality of ratios which is closest to the expected ratio may be selected as a scaling value SL in operation S350. The first ratio may be an initial value of the scaling value SL. For example, the first ratio may be a value which has a minimum difference from the expected value. The first ratio may be substantially the same as the expected ratio. According to an exemplary embodiment, the meaning of "substantially the same" may include values which are equal, nearly the same, almost the same, or the same with an allowable margin of difference.

The estimator 320 may perform the operations described in operations S310, S330 and S350.

Figure 6:
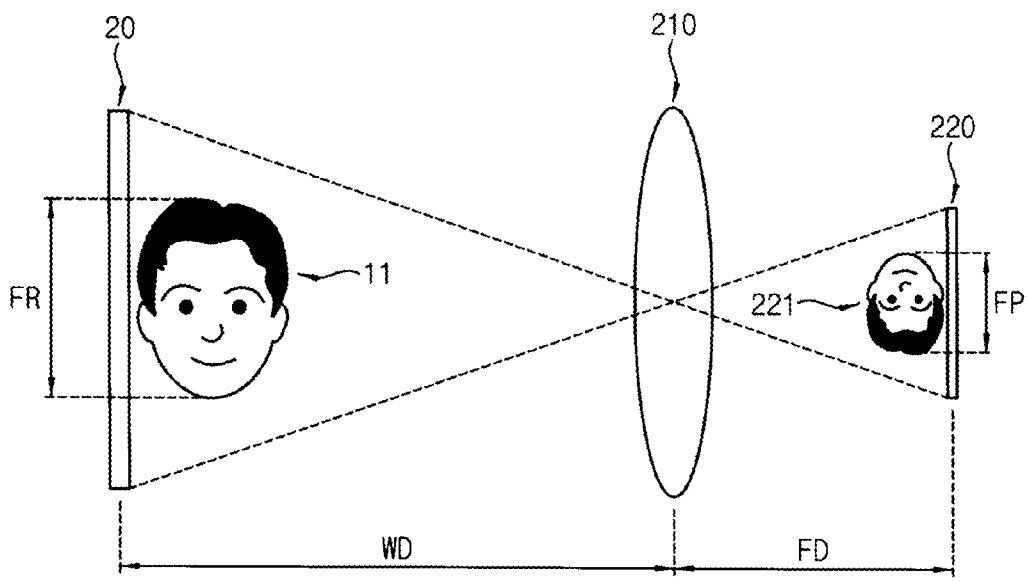
FIG. 6 is a conceptual diagram illustrating a procedure to estimate a face size described in FIG. 5.

FIG. 6 is a conceptual diagram illustrating a procedure to estimate a face size described in FIG. 5.

Referring to FIGS. 1, 5 and 6, a size of a scene 20 captured by the pickup module 200 may be determined based on the field of view (FOV) of the image pickup module 200. The reference face size FR may be a face size included in the scene 20 and may be between about 17 cm to 21 cm as mentioned above. The pseudo distance WD may indicate a distance between the lens 210 and the object 10, e.g., the face 11 when the first image IMG1 is obtained, and may be calculated as described in FIG. 3. The focal distance FD may indicate a distance between a lens 210 and a sensor 220 and may be calculated based on the position of the lens 210 that is detected in operation S230. The estimated face size FP may indicate a size of a face image 221 obtained by the sensor 220 based on a light signal that is incident on the lens 210.

The following formula (1) is an equation to indicate the relationship of the reference face size FR, the estimated face size FP, the pseudo distance WD and the focal distance FD.

[Formula 1]

$$FR:FP=WD:FD \qquad (1)$$

The estimated face size FP may be expressed in Formula (2) based on Formula (1).

[Formula 2]

$$FP=(FR*FD)/WD \qquad (2)$$

When the sensor 220 is an image sensor, if a size I of the sensor 220 and a number of pixels PX included in the sensor 220 is known, a number of pixels FPPX included in the estimated face size FP may be expressed in the following Formula (3).

[Formula 3]

$$FPPX=\{(FR*FD)/WD\}*(PX/I) \qquad (3)$$

Figure 7:
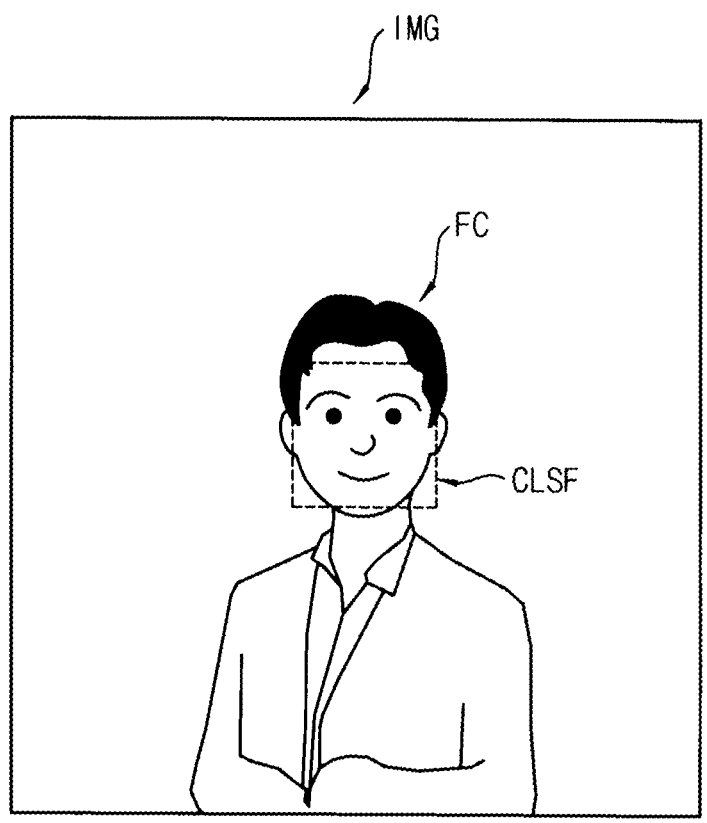
FIG. 7 is a conceptual diagram illustrating a procedure to estimate a ratio and a procedure to determine the scaling value described in FIG. 5.

FIG. 7 is a conceptual diagram illustrating a procedure to estimate a ratio and a procedure to determine the scaling value described in FIG. 5. Specifically, FIG. 7 is a conceptual diagram illustrating an exemplary embodiment of a face classifier for the face detection.

Referring to FIGS. 5, 6 and 7, a face classifier CLSF may detect a face region FC included in an image IMG. The face classifier CLSF may have a reference window which is represented by a rectangular dotted line in FIG. 7 and information for detecting the face region FC such as eye information of a human face (or an image), or mouth information of a human face (or an image), etc. The face classifier CLSF may detect the face region FC based on at least one of various face detection algorithms. For example, the face classifier CLSF may detect the face region FC based on a face detection algorithm according to HAAR-like features that is known for Viola-Jones face detection algorithm. The shape of the face classifier CLSF and/or the algorithm for detecting the region FC based on the face classifier CLSF may be changed in various ways.

In operation S330 of FIG. 5, the expected ratio may be calculated. A number of pixels FPPX included in the expected face size FP may be calculated based on a size of sensor 220, a number of pixels included in the sensor 220 and the expected face size FP. The expected ratio may be expressed as a ratio of the number of pixels FPPX included in the expected face size FP to the number of pixels included in the reference window. The face classifier CLSF and the expected face size FP may correspond to regions of a rectangular shape which have the same aspect ratio. For example, if the number of pixels FPPX included in the expected face size FP is 100 and the number of pixels included in the reference window is 30, the expected ratio is 3.33.

In operation S350 of FIG. 5, the initial value of the scaling value SL may be selected. Generally, a plurality of ratios may be a plurality of numbers that increase or decrease by a unit. For example, when the plurality of ratios are ten numbers between one to ten increasing by one and the expected ratio is about 3.33, the scaling value SL may be selected to be 3 that is closest to the expected ratio, 3.33. On the other hand, when the plurality of ratios are nineteen numbers between one to ten increasing by 0.5 and the expected ratio is about 3.33, the scaling value SL may be selected to be 3.5 that is closest to the expected ratio, 3.33. According to the selected scaling value SL, the first image IMG1 or the reference window of the face classifier CLSF may be scaled.

Figure 9:
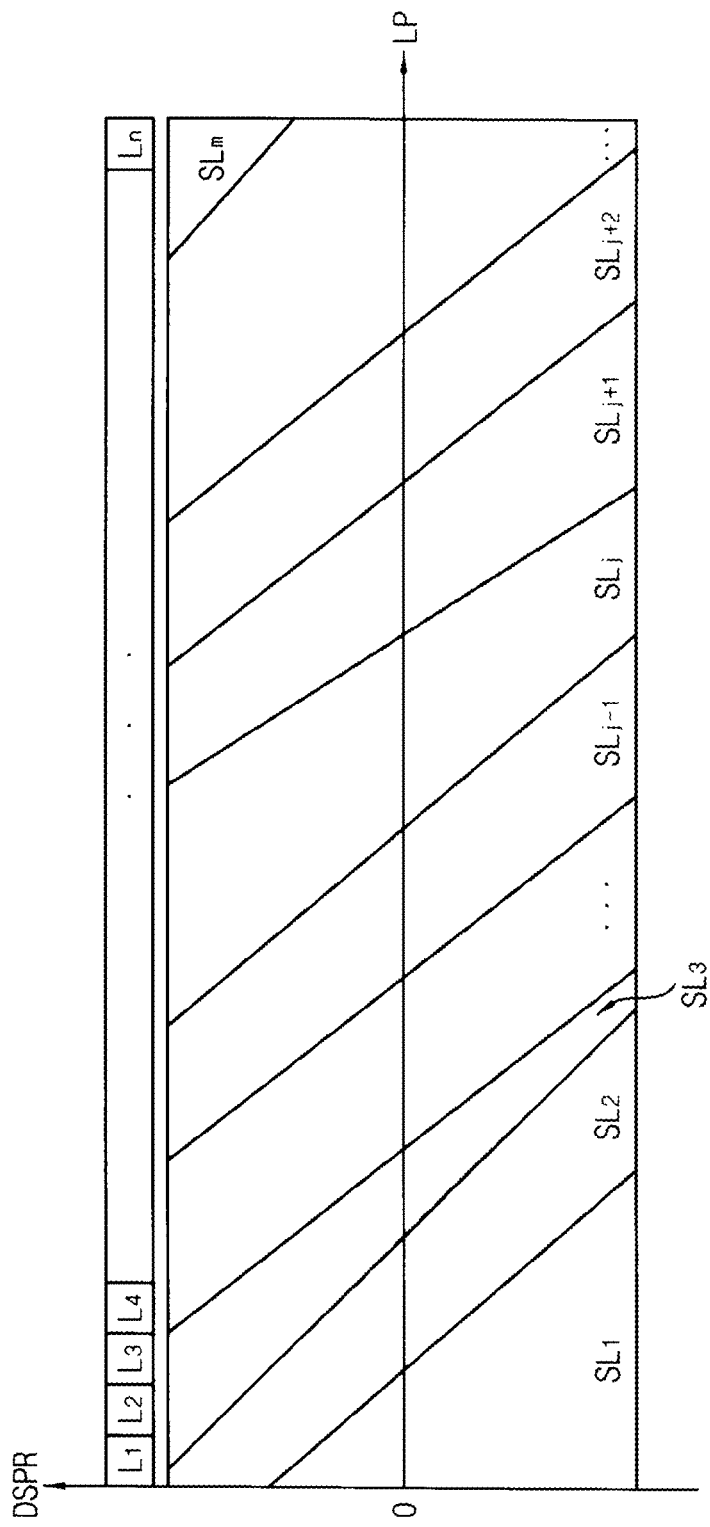

FIGS. 8 and 9 are conceptual diagrams illustrating procedures to obtain the pseudo distance and determine the scaling value described in FIG. 2.

As described with reference to FIGS. 2, 3 and 5, in operation S200, the pseudo distance may be obtained by performing the operations S210, S230 and S250, and S300, and the scaling value SL may be determined to be the first ratio by performing the operations S310, S330 and S350. However, if the same operations as mentioned above are performed for every face detection, the workload of the face detection device 100 in FIG. 1 may increase excessively. Thus, if the scaling value is determined based on the distance information DSPR and the position of the lens 210, the workload of the face detection device 100 in FIG. 1 may be reduced.

Referring to FIGS. 1, 2, 8 and 9, a lookup table, e.g., a pseudo distance table, for determining the scaling value SL based on the distance information DSPR and the position, e.g., the current position, of the lens 210 is illustrated. The lookup table may be stored in the estimator 320 and may be defined to correspond to the characteristics of the image pickup module 200 as determined by prior experiments.

In the lookup table shown in FIGS. 8 and 9, n lenses $L_1$ through $L_n$ (n is a natural number) may be determined to focus the n lenses to the object 10 and m scaling values $SL_1$ through $SL_m$ (m is a natural value) may be determined to perform the face detection. The number of lenses, e.g., n, may be generally greater than the number of scaling values SLs, e.g., m.

The scaling value SL may be determined based on the lookup table. For example, as shown in FIG. 8, if the distance information DSPR, e.g., the disparity value, is +3 and the position of the lens 210 is $L_5$, the scaling value SL may be determined to be $SL_2$. Thus, by direct determination of the scaling value SL without obtaining the pseudo distance, the workload of the face detection device 100 in FIG. 1 and a system including the face detection device 100 may be reduced.

Figure 10:
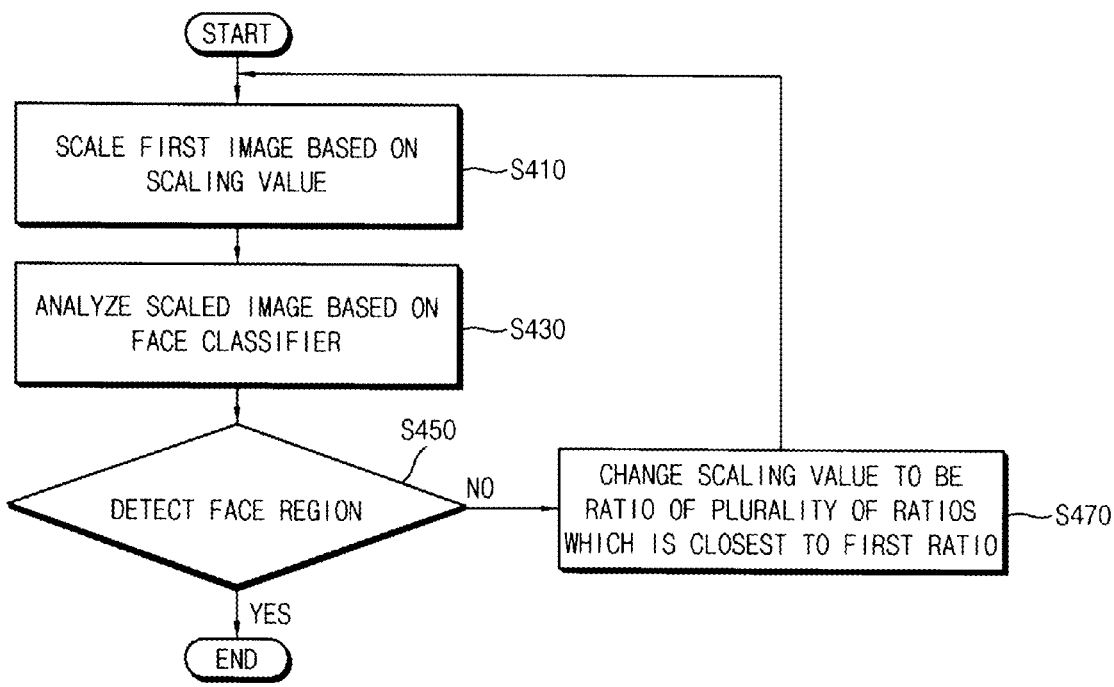
FIG. 10 is a flow chart illustrating a method of face detection described in FIG. 2.

FIG. 10 is a flow chart illustrating a method of face detection described in FIG. 2.

According to an exemplary embodiment, a face detection may be performed with a reduced size of the first image IMG1 while fixing the size of the reference window of the face classifier.

Referring to FIGS. 1, 2, 5 and 10, in operation S400 for detecting a face of the first image IMG1, the first image IMG1 may be scaled based on the scaling value SL having a selected ratio in operation S410. The selected ratio may be a first ratio. For example, if the first scaling value SL is 3 or 3.5 in operation S350 in FIG. 5, an image, e.g., a first reduced image, the size of which is 3 or 3.5 times smaller than the size of the first image IMG1 by scaling down the first image IMG1, may be obtained.

The scaled image, e.g., the first reduced image, may be analyzed based on the face classifier in operation S430. For example, the first reduced image IMG1 may be analyzed by scanning the entire first reduced image by using the reference window of the face classifier.

Whether a face region corresponding to the reference window of the face classifier is detected in the scaled image (the first reduced image) is determined in operation S450.

When the face region is detected by analyzing the scaled image (the first reduced image) in operation S450, the face detection is completed. On the other hand, when the face region is not detected by analyzing the scaled image (the first reduced image) in operation S450, the scaling value SL may be changed to be a second ratio which is closest to the first ratio of the plurality of ratios in operation S470. For example, when the scaling value SL is selected to be 3 of the plurality of ratios which include ten numbers from one to ten increasing by one in operation S350 in FIG. 5, the scaling value SL may be changed to be 2 or 4. On the other hand, when the scaling value SL is selected to be 3.5 of the plurality of ratios which include nineteen numbers from one to ten increasing by 0.5 in operation S350 in FIG. 5, the scaling value SL may be changed to be 3 or 4.

The operations in operations S410, S430 and S450 may be repeated based on the changed scaled value SL. For example, a second reduced image may be obtained by scaling down the first image IMG1 based on the scaling value having the second ratio in operation S410. The second reduced image may be analyzed based on the face classifier in operation S430. Whether the face region in the second reduced image is detected may be determined in operation S450.

The operations in operations S410, S430, S450 and S470 may be repeated until the face region is detected. In other word, if the scaling value SL is initially determined to be $SL_j$ based on the pseudo distance, the face detection may be repeatedly performed by changing the scaling value SL by an order of $SL_j$, $SL_{j-1}$, $SL_{j+1}$, $SL_{j-2}$, $SL_{j+2}$, . . . .

Figure 11A:
FIGS. 11A, 11B, 12A, and 12B are images illustrating a method of performing downscaling of a first image described in FIG. 10.
Figure 11B:
Figure 12A:
Figure 12B:

FIGS. 11A, 11B, 12A, and 12B are images illustrating a method of performing downscaling of a first image described above in connection with FIG. 10. FIG. 11A illustrates an image which is in focus. FIG. 11B illustrates an image which is scaled down from the image in FIG. 11A. FIG. 12A illustrates an image which is out of focus. FIG. 12B illustrates an image which is scaled down from the image in FIG. 12A.

Referring to FIGS. 11A, 11B, 12A and 12B, the image in FIG. 11B which is scaled down from the image (in-focus) in FIG. 11A shows a close similarity to the image in FIG. 12B which is scaled down from the image (out-of-focus) in FIG. 12A. Thus, the face detections on the image in focus and the image out of focus may be substantially the same.

Figure 13:
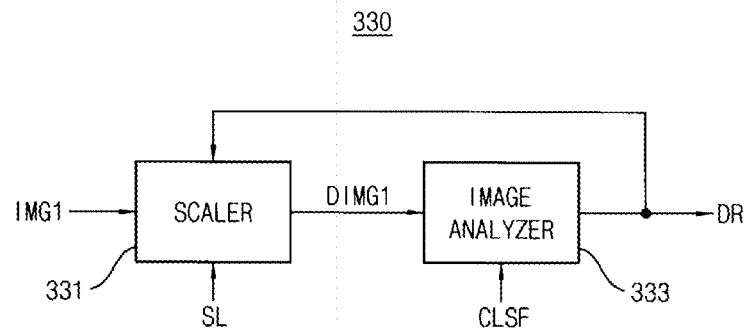
FIG. 13 is a block diagram of a detector included in the face detection device shown in FIG. 1 according to an exemplary embodiment.

FIG. 13 is a block diagram of a detector included in the face detection device shown in FIG. 1 according to an exemplary embodiment.

Referring to FIGS. 1, 7 and 13, the detector 330 may include a scaler 331 and an image analyzer 333.

The scaler 331 may generate a scaled image DIMG1 by scaling the first image IMG1 based on the scaling value SL. For example, the scaler 331 may obtain a first reduced image by scaling down the first image IMG1 based on the scaling value SL having the first ratio.

The image analyzer 333 may analyze the scaled image DIMG1 (e.g., the first reduced image) based on a face classifier CLSF described in FIG. 7. The image analyzer 333 may generate the detection signal DR in FIG. 1 that indicates an analysis result of the scaled image DIMG1 (e.g., the first reduced image).

When the face region is detected by analyzing the scaled image DIMG1 (e.g., the first reduced image), the detection signal DR may include first information which indicates that the face detection is completed and second information about the face region. The data processing module 300 may complete the face detection based on the detection signal DR.

When the face region is not detected by analyzing the scaled image DIMG1 (e.g., the first reduced image), the detection signal DR may include third information which indicates that the face detection is not completed. The estimator 320 may change the scaling value SL to be a scaling value having the second ratio that is closest to the first ratio of the plurality of ratios. The scaler 331 may obtain the second reduced image by scaling the first image IMG1 based on the scaling value SL having the second ratio. The image analyzer 333 may analyze the second reduced image based on the face classifier CLSF.

Figure 14:
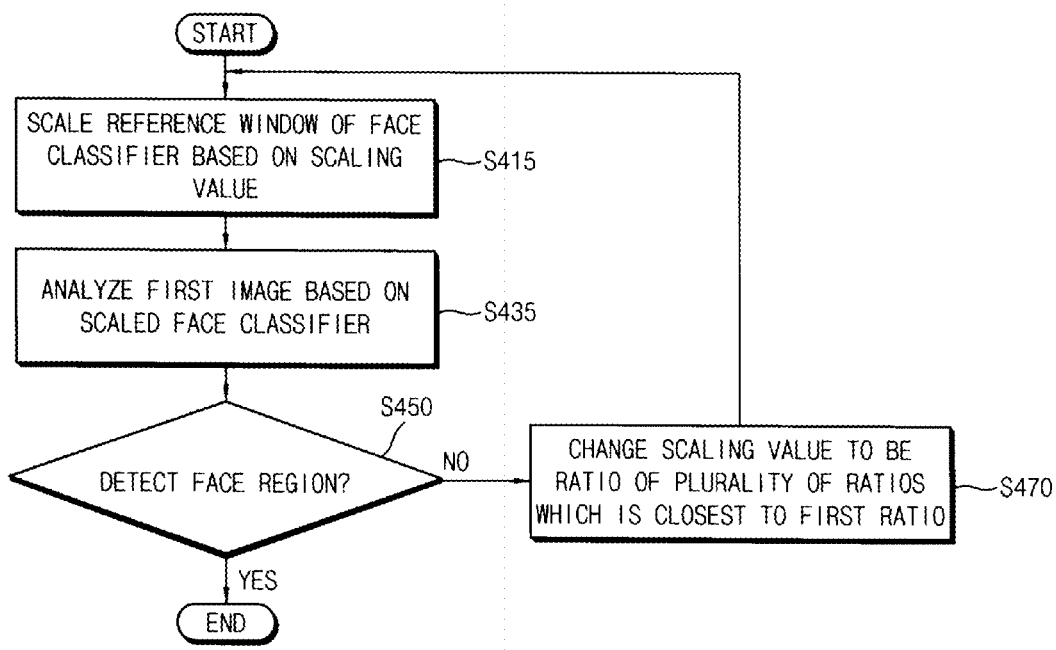
FIG. 14 is a flow chart illustrating a method of face detection according to an exemplary embodiment.

FIG. 14 is a flow chart illustrating a method of face detection according to an exemplary embodiment.

FIG. 14 illustrates a face detection with a fixed size of the first image IMG1 while increasing a size of the reference window of the face classifier.

Referring to 1, 2 and 14, in operation S400 for detecting a face of the first image IMG1, the reference window of the face classifier may be scaled based on the scaling value having the first ratio in operation S415. For example, if the previous scaling value SL is 3 or 3.5 in operation S350 in FIG. 5, a face classifier having a first magnified reference window the size of which is 3 or 3.5 times greater than the size of the previous reference window of the face classifier by scaling up the previous reference window of the face classifier may be obtained.

The first image IMG1 may be analyzed based on the scaled face classifier, e.g., the face classifier having the first magnified reference window in operation S435. For example, the first image IMG1 may be analyzed by scanning the whole first image by using the first magnified face classifier.

Whether a face region in the first image is detected by using the scaled face classifier is determined in operation S450.

When the face region is detected by analyzing the first image in operation S450, the face detection is completed. On the other hand, when the face region is not detected by analyzing the first image in operation S450, the scaling value SL may be changed to be a second ratio which is closest to the first ratio of the plurality of ratios in operation S470. For example, when the scaling value SL is selected to be 3 of the plurality of ratios which include ten numbers from one to ten increasing by one in operation S350 in FIG. 5, the scaling value SL may be changed to be 2 or 4. On the other hand, when the scaling value SL is selected to be 3.5 of the plurality of ratios which include nineteen numbers from one to ten increasing by 0.5 in operation S350 in FIG. 5, the scaling value SL may be changed to be 3 or 4.

The operations in operations S415, S435 and S450 may be repeated based on the changed scaled value SL. For example, a scaled face classifier (e.g., the face classifier having the second magnified reference window) may be obtained by scaling up the reference window of the face classifier based on the scaling value having the second ratio in operation S415. The first image IMG1 may be analyzed based on the scaled face classifier (e.g., the face classifier having the second magnified reference window) in operation S435. Whether the face region in the first image IMG1 is detected may be determined in operation S450. A size of the second magnified reference window may be two or three times, or three or four times greater than the size of the previous reference window.

The operations in operations S415, S435, S450 and S470 may be repeated until the face region is detected. In other word, if the scaling value SL is initially determined to be $SL_j$ based on the pseudo distance, the face detection may be repeatedly performed by changing the scaling value SL by an order of $SL_j$, $SL_{j-1}$, $SL_{j+1}$, $SL_{j-2}$, $SL_{j+2}$, . . . .

Figure 15:
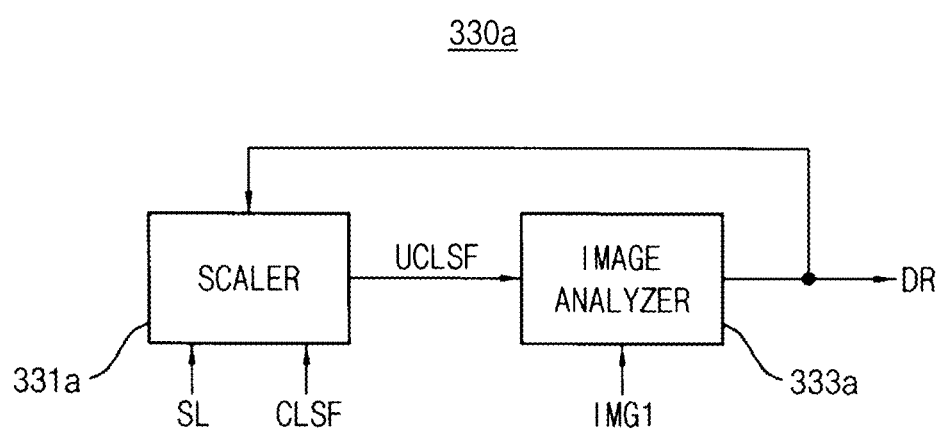
FIG. 15 is a block diagram of a detector included in the face detection device in shown in FIG. 1 according to another exemplary embodiment.

FIG. 15 is a block diagram of a detector included in the face detection device in shown in FIG. 1 according to another exemplary embodiment.

Referring to FIGS. 1 and 15, the detector 330A may include a scaler 331A and an image analyzer 333A.

The scaler 331A may generate a scaled face classifier UCLSF by scaling the face classifier based on the scaling value SL. For example, the scaler 331A may obtain a face classifier having the first magnified reference window by scaling up the reference window of the classifier CLSF based on the scaling value SL having the first ratio.

The image analyzer 333A may analyze the first image IMG1 based on the scaled face classifier UCLSF (e.g., the face classifier having the first magnified reference window). The image analyzer 333A may generate the detection signal DR in FIG. 1 that indicates an analysis result of the first image IMG1.

When the face region is detected by analyzing the first image IMG1, the detection signal DR may include first information which indicates that the face detection is completed and second information about the face region. The data processing module 300 may complete the face detection based on the detection signal DR.

When the face region is not detected by analyzing the first image IMG1, the detection signal DR may include third information which indicates that the face detection is not completed. The estimator 320 may change the scaling value SL to be a scaling value having the second ratio that is closest to the first ratio of the plurality of ratios. The scaler 331A may obtain a face classifier having a second magnified reference window by scaling the reference window of the face classifier CLSF again, based on the scaling value SL having the second ratio. The image analyzer 333A may analyze the first image IMG1 based on the scaled face classifier UCLSF having the second magnified reference window.

Figure 16A:
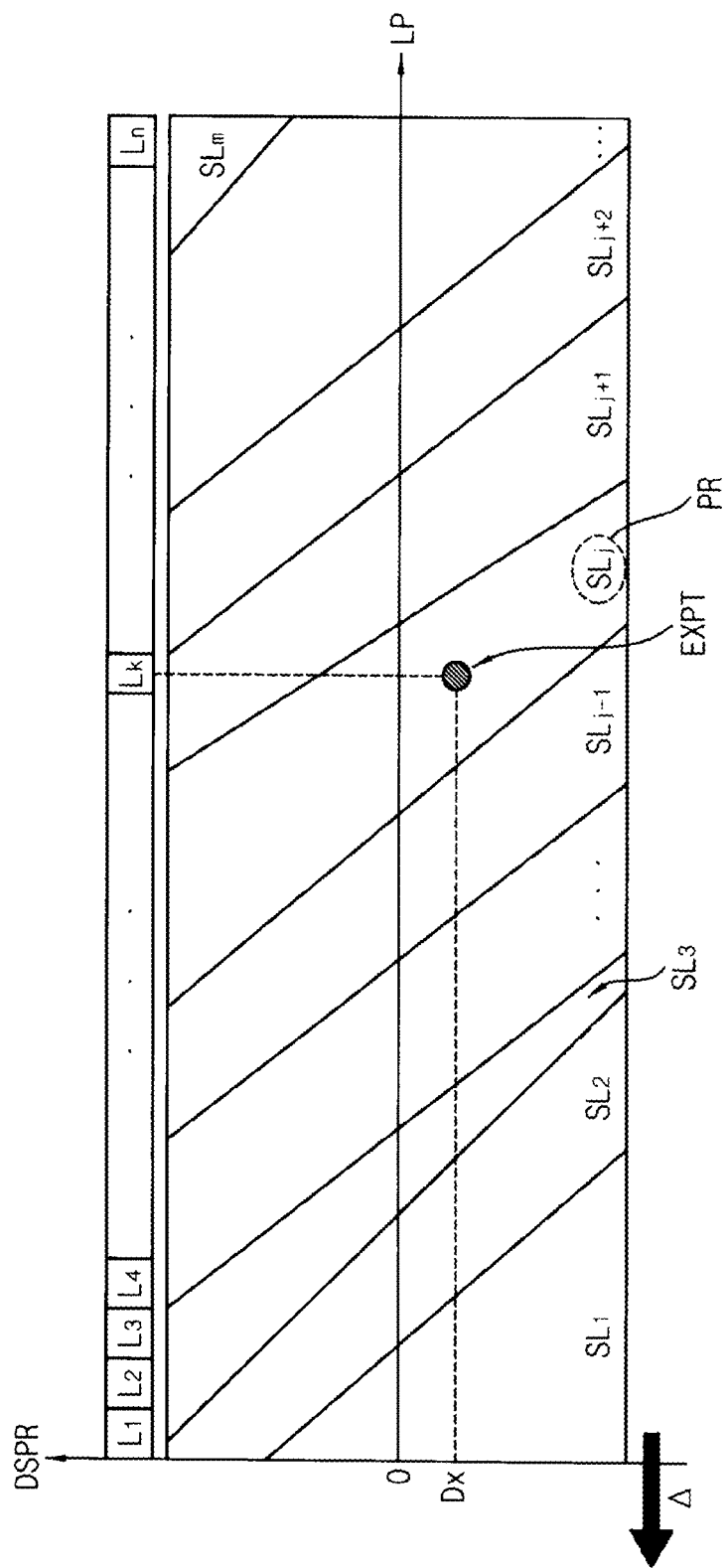
FIGS. 16A and 16B are conceptual diagrams illustrating a method of face detection.
Figure 16B:
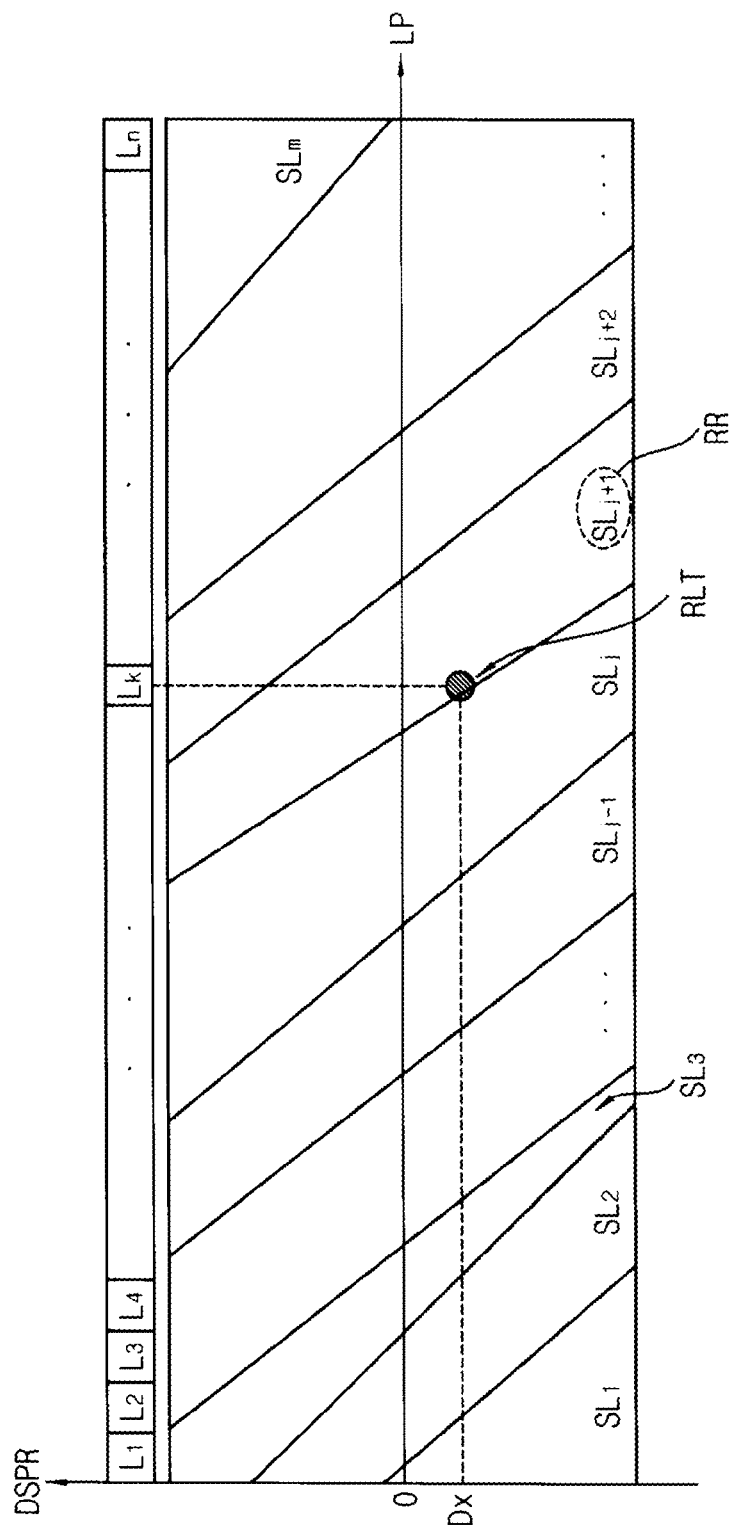

FIGS. 16A and 16B are conceptual diagrams illustrating a method of face detection.

As described with reference to FIGS. 8 and 9, the scaling value SL may be effectively determined based on the predefined lookup table. However, the accuracy of the lookup table may be lowered according to an operating environment where the face detection device 100 works so that adapting the lookup table, for example, a temporal adaptation, may be advantageous to secure the accuracy of the lookup table.

Referring to FIGS. 1, 2, 8, 9, 16A, and 16B, the relationship between the position of the lens 210 and the pseudo distance may vary according to the operating environment where the face detection device 100 works. For example, the expected face size and the size of the face region obtained by detecting a face may be different from each other. In other word, the expected face size and the real (analyzed) face size may be different.

Specifically, as shown in FIG. 16A, if the distance information DSPR is $D_x$ and the position of the lens 210 is $L_k$ (k is a natural number that is equal to or greater than 1), an initial scaling value SL may be determined based on an expected ratio corresponding to a point EXPT that is an cross point of $D_x$ and $L_k$ in the lookup table. That is, when the face detection of the first image IMG1 is performed, the initial scaling value SL may be $SL_j$ (j is a natural number that is equal to or greater than 1). Here, the $SL_j$ may be a first ratio PR that is closest to the expected ratio.

While detecting a face in an particular operating environment, the face region may not be detected based on the scaling value $SL_j$, but may be detected based on the scaling value $SL_{j+1}$. Here, the values in the lookup table may be shifted by Δ to adapt the lookup table to the particular operating environment. For example, Δ may be determined based on a difference between an initial scaling value and a changed scaling value, a number of scaling values M, and/or a number of the positions of the lenses N, etc.

As shown in FIG. 16B, after adapting the lookup table, if the distance information DSPR is $D_x$ and the position of the lens 210 is $L_k$ (k is a natural number that is equal to or greater than 1), an initial scaling value SL may be determined based on an expected ratio corresponding to a point RLT that is a cross point of $D_x$ and $L_k$ in the lookup table. That is, when the face detection of a second image that is different from the obtained first image IMG1 is performed, the initial scaling value SL may be $SL_{j+1}$ having a second ratio RR (j is a natural number that is equal to or greater than 1) that is different from the scaling value SLj having a first ratio PR. Here, the initial scaling value SL may be changed from the first ratio PR to the second ratio RR.

In other words, when a face detection of the first image IMG1 is performed, the first ratio RR is determined as the initial scaling value. But, the face region included in the first image IMG1 may be detected based on the second ratio RR that is different from the first ratio PR. Here, when the face detection of a second image that is different from the obtained first image IMG1 is performed, the initial scaling value SL may be $SL_{j+1}$ having a second ratio RR (j is a natural number that is equal to or greater than 1) that is different from the scaling value SLj having a first ratio PR. Here, the face detection of the second image is performed by selectively changing the scaling value SL based on second ratio RR.

According to an exemplary embodiment, the temporal adaptation of the lookup table may be maintained while a face detection is performed or the image pickup module 200 is active. In other words, when the image pickup module is deactivated, the temporal adaptation of the lookup table may be reset and the lookup table may be recovered from the table shown in FIG. 16B to the table shown in FIG. 16A.

Figure 17:
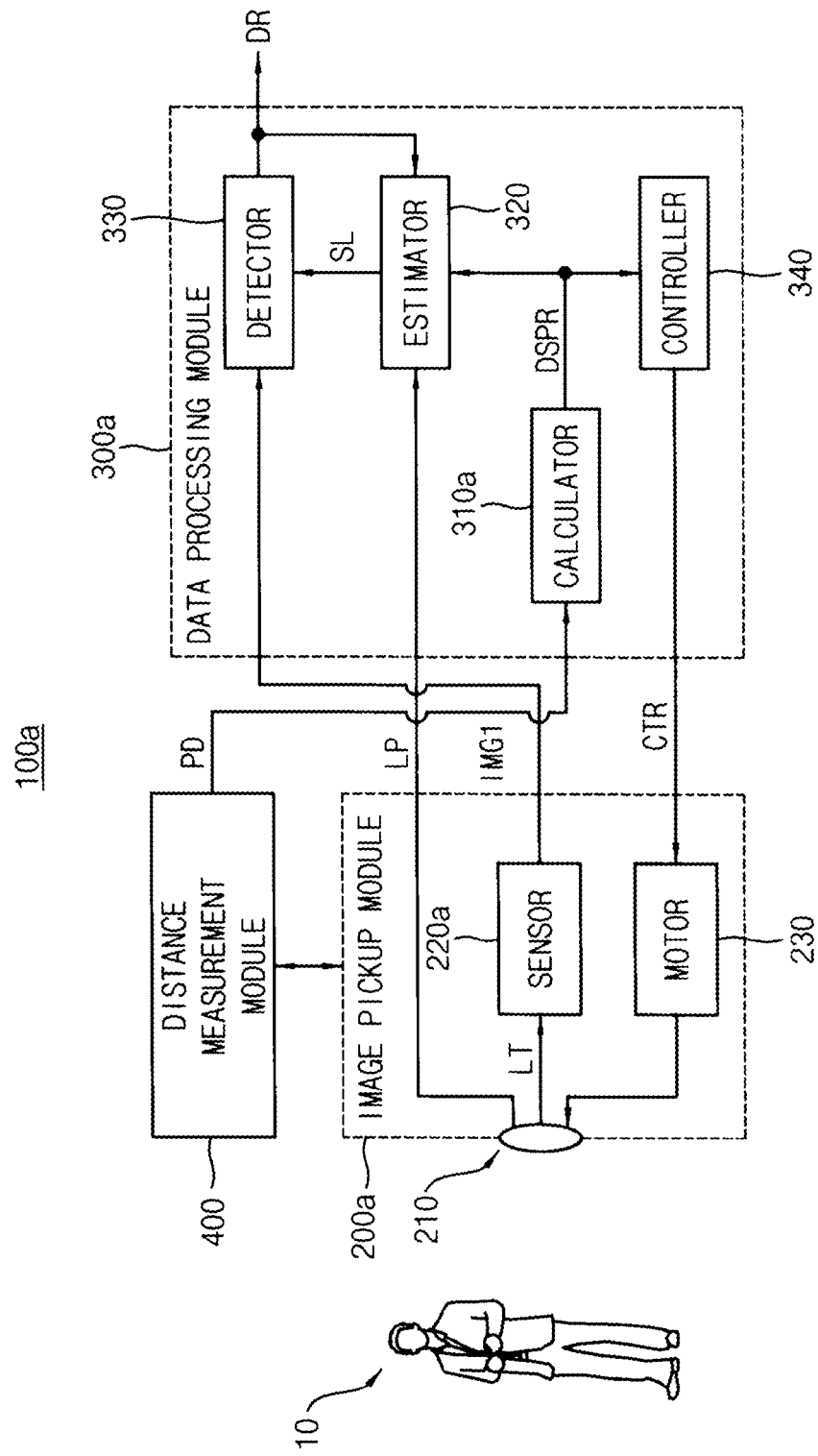
FIG. 17 is a block diagram of a face detector according to an exemplary embodiment.

FIG. 17 is a block diagram of a face detector according to an exemplary embodiment.

Referring to FIG. 17, the face detection device 100A may include an image pickup module 200A and a data processing module 300A. The face detection device 100A may further include a distance measurement module 400.

The image pickup module 200A may obtain a first image IMG1 including image information of an object 10 which is out of focus. The image pickup module 200A may obtain a second image including image information of the object 10 which is focused after obtaining the first image IMG1.

The image pickup module 200A may include a lens 210. The image pickup module 200A may further include a sensor 220A and a motor 230.

The lens 210 may concentrate a light signal LT on the sensor 220A. The sensor 220A may obtain the first image IMG1 based on the light signal LT. The motor 230 may control a position of the lens 210 based on a control signal CTR received from the data processing module 300A. The image pickup module 200A may generate a first signal LP which indicates the position of the lens 210, e.g., the current position of the lens 210.

According to an exemplary embodiment, the sensor 220A may be an image sensor. For example, the image sensor may be an RGB sensor.

The distance measurement module 400 may communicate with the image pickup module 200A, and may obtain a first data PD corresponding to a distance information DSPR to the object 10. For example, the first data may include phase difference information and the distance information DSPR to the object 10 may be extracted based on the first data PD when the first image IMG1 is obtained.

According to an exemplary embodiment, the distance measurement module may include an image sensor. The image sensor, for example, the depth sensor, may obtain the first data PD corresponding to the distance information DSPR.

The data processing module 300A may determine a pseudo distance between the object 10 and the lens 210 (or the image pickup module 200) when the first image IMG1 is obtained, determine a first ratio out of a plurality of ratios as a scaling value SL for detecting a face based on the pseudo distance, and perform face detection of the first image IMG1 by selectively changing the scaling value SL based on the first ratio.

The data processing module 300A may include a calculator 310A, estimator 320, and detector 330. The data processing module 300A may further include a controller 340.

The calculator 310A may generate the distance information DSPR to the object 10 based on the first data PD when the first image IMG1 is obtained. The distance information DSPR may include a disparity value described in FIGS. 4A, 4B and 4C. The estimator 320 may receive from the image pickup module 200A the first signal LP which indicates the current position of the lens 210 when the image pickup module 200A obtains the first image IMG1. The estimator 320 may calculate the pseudo distance based on the distance information DSPR and the position of the lens 210 and may determine the scaling value SL based on the pseudo distance. The estimator 320 may change the scaling value SL by selecting one of the values stored in a lookup table based on a detection signal DR. The detector 330 may perform face detection of the first image IMG1 based on the scaling value SL, and may generate the detection signal DR which indicates a face detection result. The controller 340 may generate a control signal CTR to control the position of the lens 210 based on the distance information DSPR.

Other than the distance measurement module 400 that obtains the first data PD corresponding to the distance information DSPR and the pickup module 200A that obtains the first image IMG1 including the image information, the face detection device 100A is substantially same as the face detection device 100 in FIG. 1 in view of the operation and the structure.

According to some exemplary embodiments, a method of face detection by a face detection device may include detecting a face of the first image IMG1 that is out of focus. Specifically, an initial scaling value SL for detecting a face may be determined based on the pseudo distance between the lens 210 and the object 10 when the first image IMG1 is obtained. The face detection of the first image IMG1 may be performed by selectively changing the scaling value SL according to the initial scaling value SL. Thus, the workload of the face detection may be reduced compared to a workload of a face detection operation without performing the procedure for determining the initial scaling value.

Figure 18:
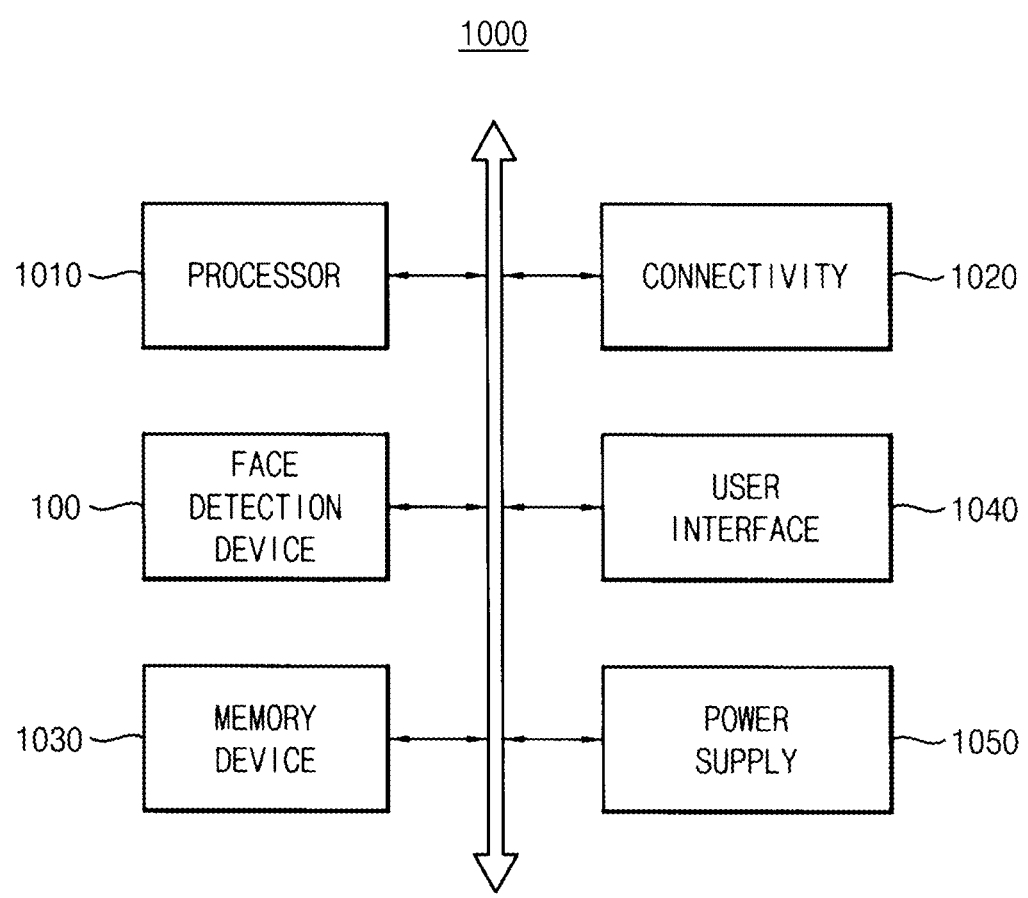
FIG. 18 is an electronic system according to an exemplary embodiment.

FIG. 18 is an electronic system according to an embodiment.

Referring to FIGS. 1, 17 and 18, the electronic system 1000 may include a processor 1010 and a face detection device 100. The electronic system 1000 may further include a connectivity unit 1020 (e.g., connectivity), a memory 1030, a user interface 1040 and a power supply 1050. The face detection device 100 and the processor 1010 may be embodied on a semiconductor substrate.

According to some exemplary embodiments, the electronic system 1000 may be a mobile device or a computer system such as a mobile phone, a smart phone, a tablet PC, a laptop computer, a personal computer, a server computer, a workstation, a personal digital assistant (PDA), a portable multimedia player (PMP), a digital camera, a camcorder, a music player, a portable game console, a navigation system, a digital television, or a set-top box, etc.

The processor 1010 may perform various computational functions such as particular calculations and tasks. For example, the processor 1010 may be a processing unit (e.g., processor) such as a central processing unit, a microprocessor, or an application processor, etc. Specifically, when the electronic system 1000 is one of the mobile devices mentioned above, the processor 1010 may execute an operating system (OS) to drive the mobile device, and execute various applications such as an Internet browser, a game, a video, or a camera, etc.

According to some exemplary embodiments, the processor 1010 may include a single processor core or multiple processor cores. In addition, the processor 1010 may further include a cache memory that can be located in the inside or outside of the processor 1010.

The connectivity unit 1020 may communicate with an external device. For example, the connectivity unit 1020 may communicate according to one of various types of protocols such as Universal Serial Bus (USB), Ethernet, Near Field Communication (NFC), Radio Frequency Identification (RFID), a Mobile Telecommunication like 4G and LTE, a memory card interface. For example, the connectivity unit 1020 may include a baseband chipset and support a communication such as GSM, GPRS, WCDMA, or HSxPA, etc.

The memory 1030 may operate as a data storage for data processed by the processor 1010 or a working memory. Specifically, when the electronic system 1000 is one of the mobile devices mentioned above, the memory 1030 may store a boot image for booting the mobile device, a file system for the operating system to drive the mobile device, a device driver for an external device connected to the mobile device, and/or an application executed on the mobile device. For example, the memory 1030 may include a volatile memory such as a Dynamic Random Access Memory (DRAM), a Static Random Access Memory (SRAM), a mobile DRAM, a Double Data Rate (DDR) Synchronous Dynamic Random Access Memory (SDRAM), a LPDDR (Low Power DDR) SDRAM, a GDDR (Graphic DDR) SDRAM, or a Rambus Dynamic Random Access Memory (RDRAM), etc., and a non-volatile memory such as an Electrically Erasable Programmable Read-Only Memory (EEPROM), a flash memory, a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), a Ferroelectric Random Access Memory (FRAM), etc.

The user interface 1040 may include at least one input device such as a keypad, a button (1043 and 1045 shown in FIG. 20), a touch screen, etc., and/or at least one output device such as a speaker (1048 shown in FIG. 20), or a display (1041 shown in FIG. 20), etc.

The power supply 1050 may provide power to the electronic system 1000.

The face detection device 100 may be controlled by the processor 1010 and may perform face detection of the first image IMG1 including image information of the object 10 that is unfocused. The face detection device 100 may be one of the face detection devices 100 and 100A described with reference to FIGS. 1 and 17, and may operate according to the methods described with reference to FIGS. 2 through 16. For example, the face detection device 100 may include an image pickup module 200 and a data processing module 300 described with reference to FIGS. 1 and 17. The face detection device 100 may determine an initial scaling value for performing face detection of the first image IMG1 based on the pseudo distance between the image pickup module 200 and the object 10 when the first image is obtained. The face detection device 100 and the electronic system including the face detection device 100 may reduce the workload for performing face detection by selectively changing the scaling value SL based on the initial scaling value.

In an exemplary embodiment, the face detection device 100 (or the image pickup module 200) may obtain a second image including image information of the object 10 that is focused. The processor 1010 may perform data processing of a first region in the second image corresponding to a face region in the first image IMG1 that is obtained by face detection. For example, the data processing operation may include an image interpolation, a color correction, a white balance, a gamma correction, and/or a color conversion, etc.

In an exemplary embodiment, at least a portion of the operations for performing face detection may be performed by instructions (e.g., a software program) that are executed by the face detection device 100 and/or the processor 1010 and are stored in the memory 1030. In another exemplary embodiment, at least a portion of the operations for performing face detection may be performed by hardware embodied in the face detection device 100 and/or the processor 1010.

The data processing module 300 included in the face detection device 100 may be separate from the processor 1010. On the other hand, as described in detail later with reference to FIGS. 23 and 24, the data processing module 300 may be embodied in the processor 1010. In addition, the electronic system 1000 may further include a data processing module for performing data processing of the first region of the second image.

When the electronic system 1000 is one of the mobile devices mentioned above, the mobile device or one of the components of the mobile device may be mounted with a package such as Package on Package (PoP), Ball grid arrays (BGAs), Chip scale packages (CSPs), (Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), or Wafer-Level Processed Stack Package (WSP), etc.

Figure 19:
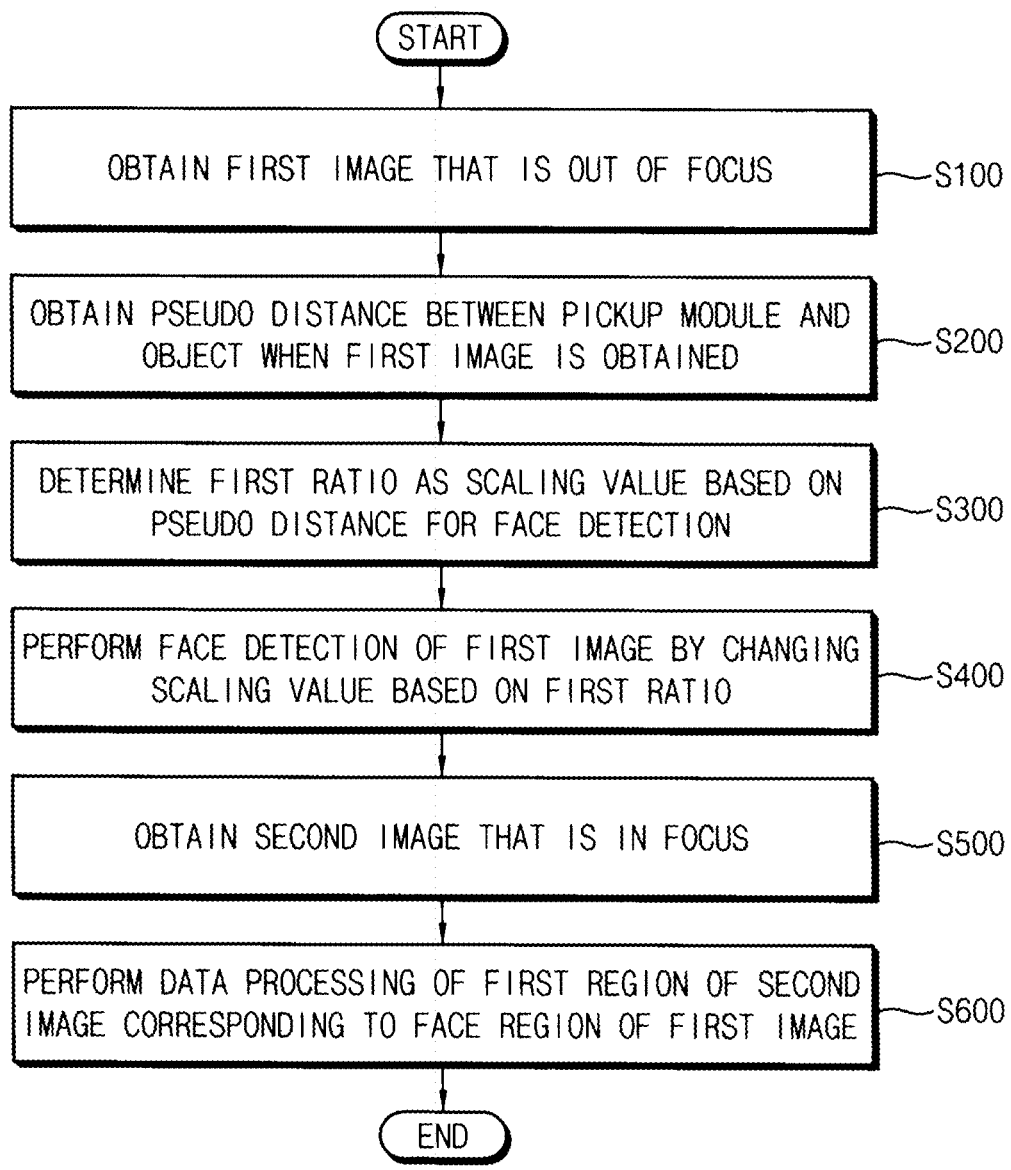
FIG. 19 is a flow chart illustrating a method of image processing according to an exemplary embodiment.

FIG. 19 is a flow chart illustrating a method of image processing according to an exemplary embodiment.

In a method of image processing with reference to FIGS. 2, 18 and 19, a first image IMG1 is obtained by the image pickup module 200 in operation S100. The first image IMG1 may be an image which includes unfocused image information of an object 10. In operation S200, a pseudo distance may be obtained when the first image IMG1 is obtained. The pseudo distance may indicate a distance between the object 10 and the image pickup module 200 when the first image IMG1 is obtained. A first ratio as a scaling value SL based on a plurality of ratios for detecting a face may be determined based on the pseudo distance in operation S300. The first ratio may be an initial value of the scaling value SL. A face detection of the first image IMG1 may be performed by selectively changing the scaling value SL based on the first ratio in operation S400. The operations S100, S200, S300 and S400 described with reference to FIG. 10 may be substantially the same as the operations S100, S200, S300 and S400 described with reference to FIG. 2.

A second image is obtained by the pickup module 200 in operation S500. The second image may be an image which includes focused image information of an object 10. A data processing operation of a first region of the second image corresponding to a face region of the first image IMG1 obtained by the face detection may be performed in operation S600. As described above, the data processing operation may include an image interpolation, a color correction, a white balance, a gamma correction, and/or a color conversion, etc.

The data processing operation in operation S600 may be performed by the processor 1010.

According to various exemplary embodiments, a method of face detection described with reference to FIGS. 1 through 19 is performed before finishing auto-focus.

An image pickup module 200 may obtain a first data corresponding to distance information DSPR and a position of lens 210. The distance information DSPR may include a disparity value which may correspond to a phase difference between a first image object that is incident on a first side of the lens 210 and a second image object that is incident on a second side of the lens 210. This disparity value may be used to control the position of lens for auto-focusing.

A data processing module 300 may generate a pseudo distance WD based on the distance information DSPR and the position of lens 210. The pseudo distance may be an expected distance between the pickup module 200 (or the lens 210) and the object 10 that is a subject for the photograph. If the face size of an average person is known to be 17 cm to 21 cm, a face size in an obtained image on the sensor 220 (e.g., image sensor) may be expected. For example, if a number of pixels corresponding to the face size incident on the sensor 220 based on a pixel size and a number of pixels in the sensor are known, a proper search window size for face detection may be expected. The search window may be a reference window of a classifier. The classifier may be a kind of detection mask which may figure out particular face patterns (eye, nose, mouth, etc.) of a human being.

When a ratio of an initial search window size (reference window) to the expected face size according to the procedure mentioned above is determined, the obtained image or the reference window for face detection may be resized, and the human face may be easily detected. Thus, by the face detection result, the auto-focusing process to focus on a human face or the object 10 will be completed efficiently and fast.

According to a face detection algorithm according to HAAR-like features that may use a HAAR face classifier, a scaled-down image of a focused image may be used for face detection. For example, a scaled-down image of an unfocused image may be very similar to the scaled-down image of a focused image, and the face detection operation may be applied to the scaled-down image of the unfocused image as well as the focused image before completion of auto-focus. Thus, after finishing a face detection operation, the auto-focus operation may be completed by adjusting the position of the lens 210.

Figure 20:
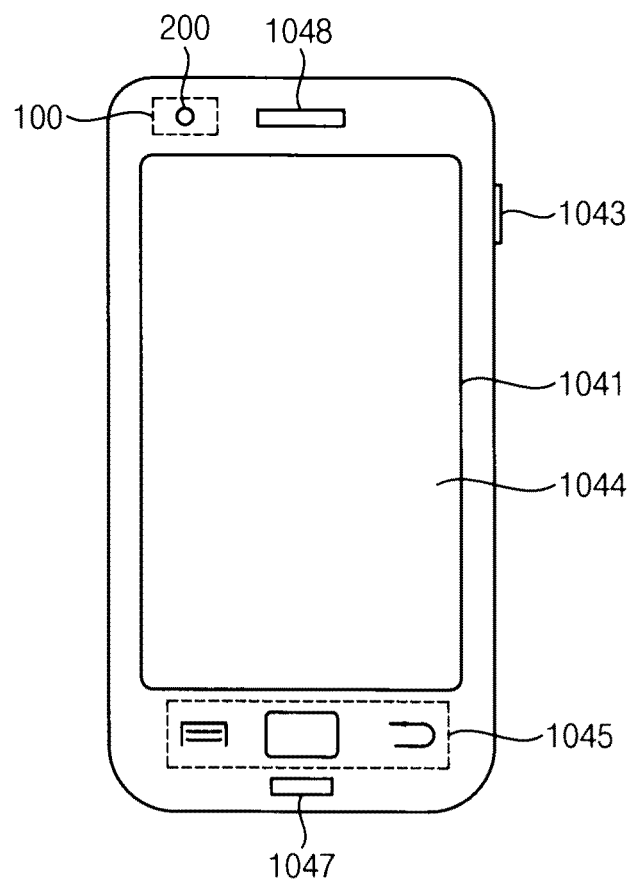
FIG. 20 is a plane view illustrating a mobile device as an electronic system according to an exemplary embodiment.

FIG. 20 is a plane view illustrating a mobile device according to an exemplary embodiment.

Referring to FIG. 20, a mobile device 1000 may include a face detection device 100, a display device 1041, a touch screen 1044, a plurality of buttons 1043 and 1045, a microphone 1047, and a speaker 1048.

The face detection device 100 may be the face detection device 100 shown in FIG. 1 and may operate according to the methods described with reference to the FIGS. 2 through 16. The face detection device 100 may include an image pickup module 200 and a data processing module 300 as described with reference to FIG. 1, and may perform face detection of a first image IMG1 that is out of focus based on a pseudo distance.

In an exemplary embodiment, the pickup module 200 may be mounted on a first side (e.g., front side) of the mobile device. Although the image pickup module 200 is illustrated as being located in the left upper region of the front side of the mobile device 1000 shown in FIG. 20, the exemplary embodiments are not limited thereto, and the image pickup module 200 may be located in any position of the mobile device 1000.

The display 1041 may be mounted on the first side of the mobile device 1000 and display the procedure of operations and/or a result of the face detection. The display device 1041 may include one of various types of displays, such as Liquid Crystal Display (LCD), Organic Light Emitting Diode (OLED) display, Field Emission Display (FED), etc.

The touch screen 1044 and the buttons 1043 and 1045 may receive a user's input, and may generate an input signal according to the user's input to perform an operation that the user intends to perform. For example, the operations that the user intends to perform may be initiated by touching the screen by a user's finger, a stylus pen, etc., or by pushing the buttons 1043 and 1045 by the user's finger. The button 1043 may be a power button to activate or deactivate the mobile device 1000. The microphone 1047 may perform voice recognition and the speaker 1048 may output sound.

In an exemplary embodiment, the touch screen 1044 may employ one of various types of sensing technologies such as capacitive sensing, resistive sensing, ultrasonic sensing, etc., and may be arranged to be overwrapped with the display 1041 as a unit. In some exemplary embodiments, at least one of buttons 1043 and 1045, a microphone 1047, and a speaker 1048 may be omitted.

Figure 21A:
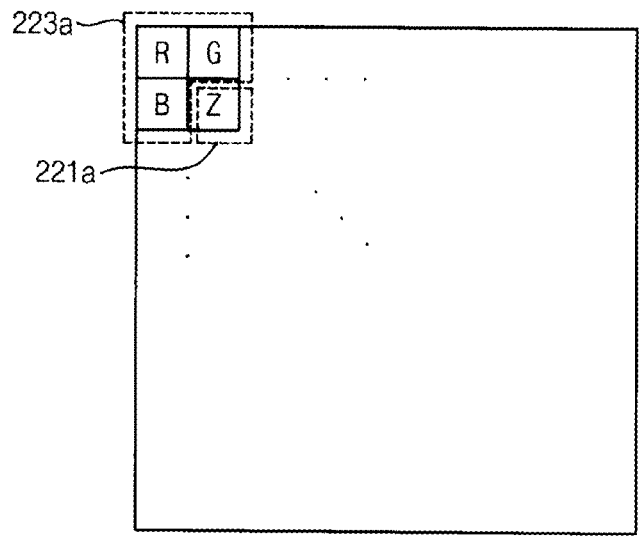
FIGS. 21A and 21B are block diagrams of image sensors included in the face detection device according to an exemplary embodiment.
Figure 21B:
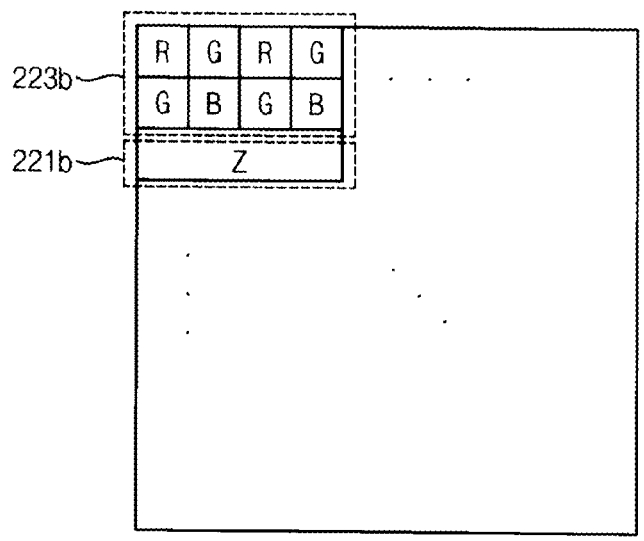

FIGS. 21A and 21B are block diagrams of image sensors included in the face detection device according to an exemplary embodiment.

Referring to FIGS. 1, 20, 21A and 21B, the sensor 220 may be a three dimensional color image sensor, and may include a plurality of distance pixels and a plurality of color pixels. According to an exemplary embodiment, the sensor 220 may include the plurality of distance pixels and the plurality of pixels that have various ratios of numbers or sizes. For example, the sensor 220A may include a plurality of distance pixels 221A and a plurality of color pixels 223A as shown in FIG. 21A, or may include a plurality of distance pixels 221B and a plurality of color pixels 223B as shown in FIG. 21B. In an exemplary embodiment, a plurality of infrared light filters or a plurality of near-infrared light filters may be arranged on the plurality of distance pixels, and a plurality of color filters (e.g., red, green, and blue filters) may be arranged on the plurality of color pixels.

Figure 22:
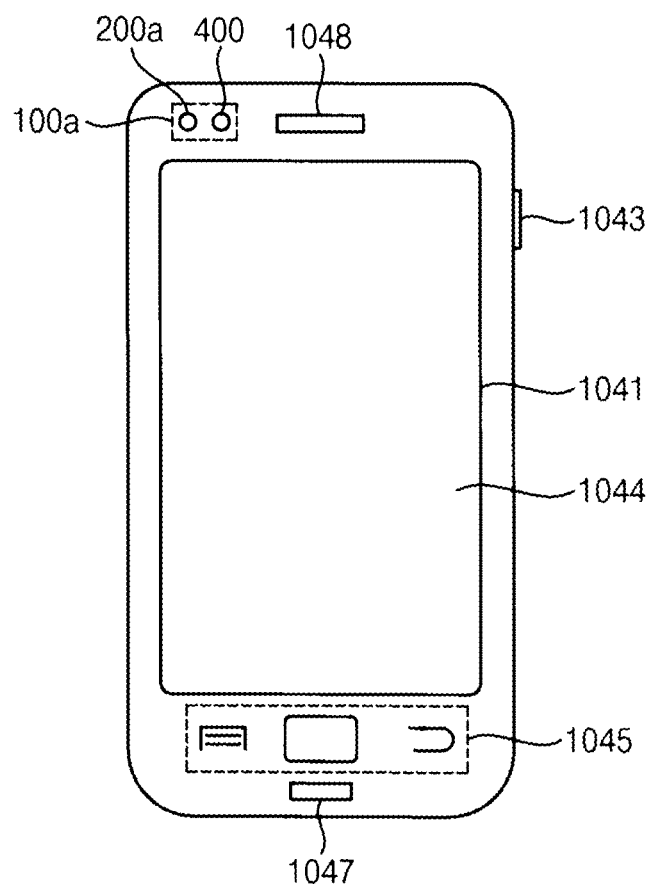
FIG. 22 is a plane view illustrating a mobile device as another electronic system according to an exemplary embodiment.

FIG. 22 is a plane view illustrating another mobile device according to an exemplary embodiment.

Referring to FIG. 22, the mobile device 1000A may include a face detection device 100A, a display device 1041, a touch screen 1044, a plurality of buttons 1043 and 1045, a microphone 1047, and a speaker 1048.

The face detection device 100A may be the face detection device 100A shown in FIG. 17 and may operate according to the methods described with reference to FIGS. 2 through 16. The face detection device 100A may include an image pickup module 200A and a data processing module 300 and a distance measurement module 400 as described with reference to FIG. 17, and may perform face detection of a first image IMG1 that is out of focus based on a pseudo distance.

A display device 1041, a touch screen 1044, a plurality of buttons 1043 and 1045, a microphone 1047 and a speaker 1048 shown in FIG. 22 may be substantially the same as the display device 1041, the touch screen 1044, the plurality of buttons 1043 and 1045, the microphone 1047 and the speaker 1048 shown in FIG. 20.

Figure 23:
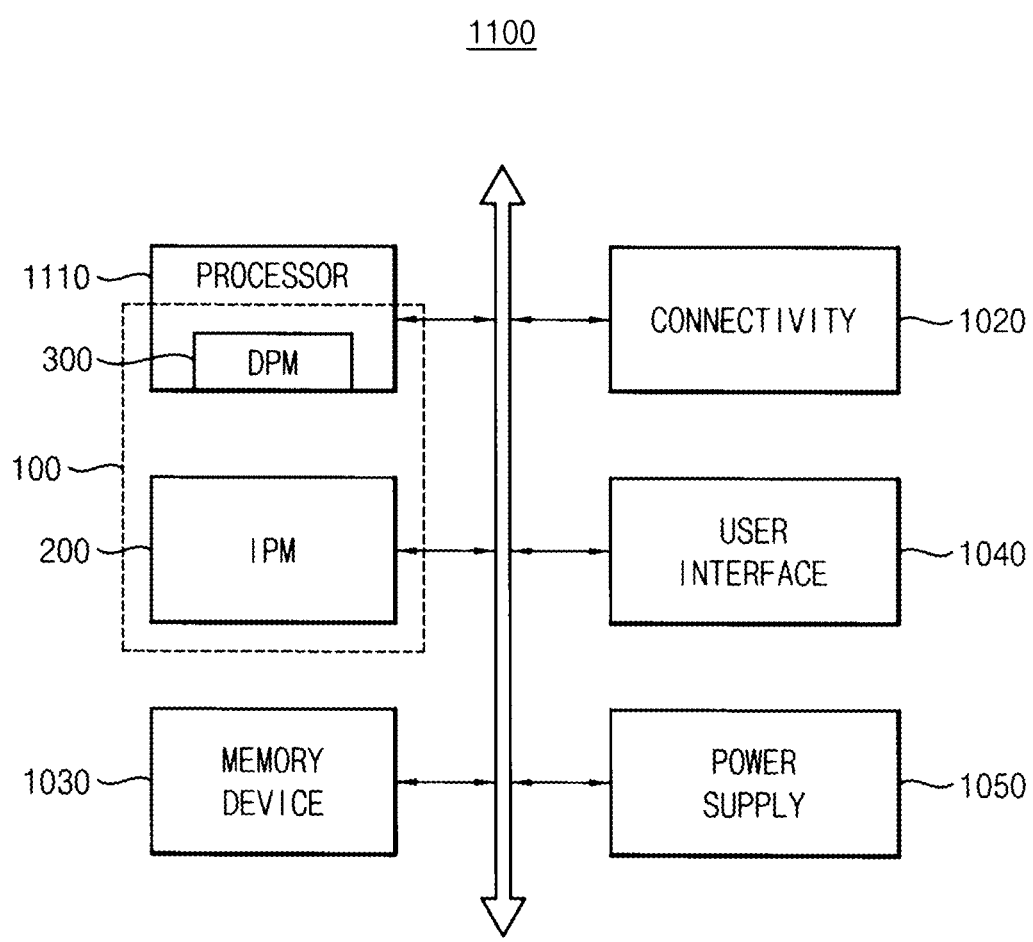
FIGS. 23 and 24 are block diagrams illustrating an electronic system according to an exemplary embodiment.
Figure 24:
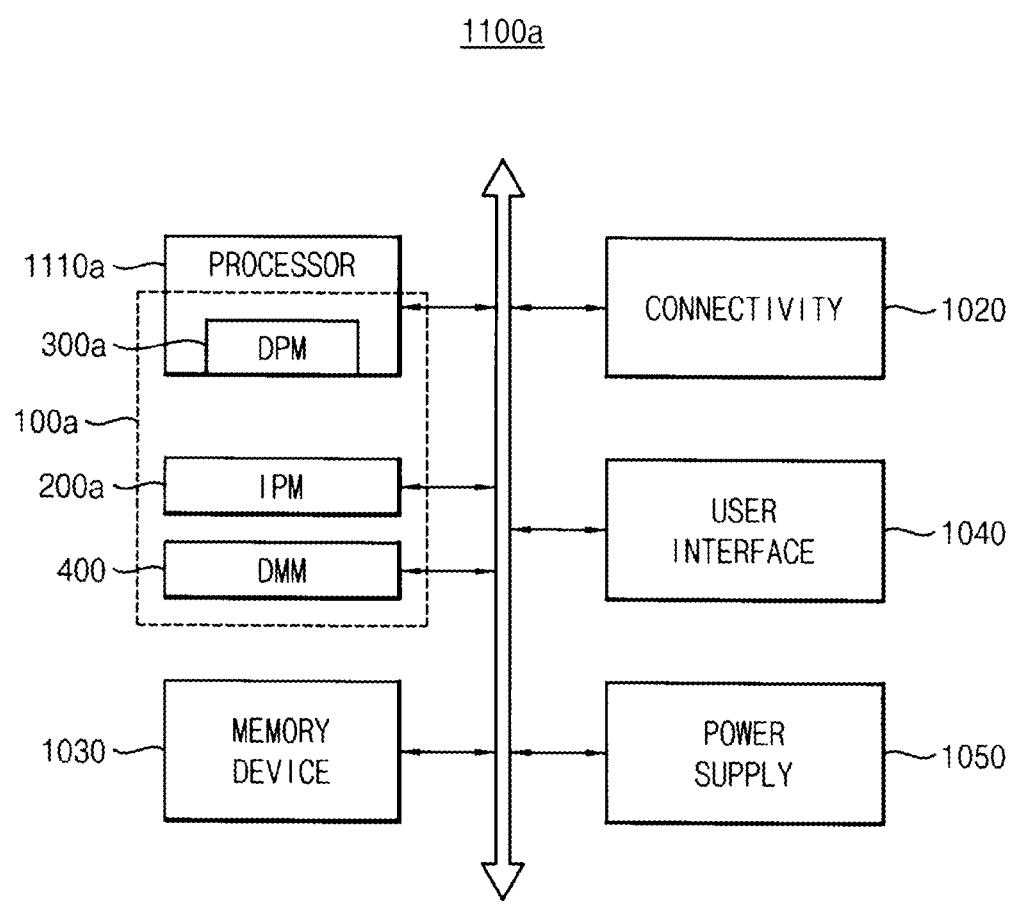

FIGS. 23 and 24 are block diagrams illustrating an electronic system according to an exemplary embodiment.

Referring to FIG. 23, the electronic system 1100 may include a processor 1110 and a face detection device 100. The electronic system 1100 may further include a connectivity unit 1020 (e.g., connectivity), a memory 1030 (e.g., memory device), a user interface 1040 and a power supply 1050.

The processor 1110 may perform various computational functions such as particular calculations and tasks. The face detection device 100 may be controlled by the processor 1110 and may perform face detection of the first image IMG1 including image information of the object 10 that is unfocused. The face detection device 100 may be one of face detection devices 100 described with reference to FIG. 1. The face detection device 100 may include an image pickup module 200 and a data processing module 300 described with reference to FIG. 1.

The data processing module 300 included in the face detection device 100 may be embodied in the processor 1110. The connectivity unit 1020, the memory 1030, the user interface 1040 and the power supply 1050 shown in FIG. 23 may be substantially the same as the connectivity unit 1020, the memory 1030, the user interface 1040 and the power supply 1050 shown in FIG. 18.

Referring to FIG. 24, the electronic system 1100A may include a processor 1110A and a face detection device 100A. The electronic system 1100A may further include a connectivity unit 1020, a memory 1030, a user interface 1040 and a power supply 1050.

The processor 1110A may perform various computational functions such as particular calculations and tasks. The face detection device 100A may be controlled by the processor 1110A and may perform face detection of the first image IMG1 including image information of the object 10 that is unfocused. The face detection device 100A may be one of the face detection devices 100A described with reference to FIG. 17. The face detection device 100A may include an image pickup module 200A, a data processing module 300A and a distance measurement module 400 described with reference to FIG. 17.

The data processing module 300A included in the face detection device 100A may be embodied in the processor 1110A. The connectivity unit 1020, the memory 1030, the user interface 1040 and the power supply 1050 shown in FIG. 24 may be substantially the same as the connectivity unit 1020, the memory 1030, the user interface 1040 and the power supply 1050 shown in FIG. 18.

Although the exemplary embodiments have been described with reference to certain exemplary embodiments thereof, it will be understood by those of ordinary skill in the art that various changes in forms and details may be made thereto without departing from the spirit and scope of the present inventive concept as defined by the following claims.

What is claimed is:

1. A method of face detection to be performed by an apparatus comprising an image pickup module, the method comprising:
obtaining a first image including image information of an object that is out of focus;
obtaining a pseudo distance between the image pickup module and the object when the first image is obtained by the obtaining;
determining a first ratio of a plurality of ratios as a scaling value based on the pseudo distance; and
performing face detection of the first image by changing the scaling value based on the first ratio,
wherein the determining the first ratio comprises:
calculating an expected ratio which is a size ratio of an expected face size of the first image to a reference window of a face classifier; and
selecting, as the first ratio, a ratio among the plurality of ratios which is closest to the expected ratio.

2. The method of claim 1, wherein the obtaining the pseudo distance comprises:
obtaining distance information of the object;
detecting a position of a lens included in the image pickup module; and
calculating the pseudo distance based on the distance information and the position of the lens.

3. The method of claim 2, wherein the distance information comprises a disparity value corresponding to a phase difference between a first object image that is incident on a first part of the lens and a second object image that is incident on a second part of the lens.

4. The method of claim 2, wherein the image pickup module is configured to obtain first data corresponding to the distance information and the first image including the image information of the object.

5. The method of claim 1, further comprising:
calculating the expected face size of the first image based on the pseudo distance, a field of view of the image pickup module and a reference face size.

6. The method of claim 5, further comprising:
obtaining a second image after the performing the face detection of the first image;
determining a second ratio of the plurality of ratios as the scaling value, the second ratio being different from the first ratio; and
performing an additional face detection of the second image by changing the scaling value based on the second ratio.

7. The method of claim 1, wherein the performing the face detection comprises:
obtaining a second image by scaling the first image based on the scaling value having the first ratio;
analyzing the second image by using the face classifier; and
completing the analyzing of the second image when a face region corresponding to the reference window of the face classifier is detected as a result of the analyzing of the second image by using the face classifier.

8. The method of claim 7, wherein the performing the face detection further comprises:
changing the scaling value to be a second ratio of the plurality of ratios when the face region is not detected based on the analyzing of the second image by using the face classifier;
obtaining a third image by scaling the first image based on the scaling value having the second ratio; and
analyzing the third image by using the face classifier.

9. The method of claim 1, wherein the performing the face detection comprises:
scaling the reference window of the face classifier based on the scaling value having the first ratio to generate a scaled reference window of the face classifier;
analyzing the first image based on the scaled reference window of the face classifier; and
completing the analyzing of the first image when a face region corresponding to the scaled reference window of the face classifier is detected as a result of the analyzing of the first image.

10. The method of claim 1, wherein the obtaining the pseudo distance, the determining the first ratio of the plurality of ratios as the scaling value, and the performing the face detection are performed by a data processing module that is separate from the image pickup module.

11. A face detection device comprising:
an image pickup module configured to obtain a first image including image information of an object that is out of focus; and
a data processing module configured to obtain a pseudo distance between the image pickup module and the object that is out of focus, determine a first ratio of a plurality of ratios as a scaling value based on the pseudo distance, and perform face detection of the first image by changing the scaling value based on the first ratio,
wherein the data processing module is configured to determine the first ratio by calculating an expected ratio which is a size ratio of an expected face size of the first image to a reference window of a face classifier, and select, as the first ratio, a ratio among the plurality of ratios which is closest to the expected ratio.

12. The face detection device of claim 11, wherein the data processing module comprises:

a calculator configured to obtain distance information of the object that is out of focus;

an estimator configured to obtain a position of a lens of the image pickup module, generate the pseudo distance based on the distance information and the position of the lens, and determine the scaling value based on the pseudo distance; and a detector configured to perform the face detection of the first image based on the scaling value.

13. The face detection device of claim 12, wherein the distance information comprises a disparity value corresponding to a phase difference between a first object image that is incident on a first part of the lens and a second object image that is incident on a second part of the lens, and the estimator comprises a lookup table associating the scaling value with the pseudo distance, and the estimator is configured to determine the scaling value using the lookup table.

14. The face detection device of claim 12, wherein the detector comprises:

a scaler configured to obtain a second image by scaling the first image based on the scaling value; and an image analyzer configured to perform an analysis of the second image based on the face classifier.

15. The face detection device of claim 14, wherein when a face region corresponding to the reference window of the face classifier is not detected as a result of the analysis of the second image, the estimator is configured to change the scaling value to be a second ratio of the plurality of ratios, and wherein the scaler is configured to obtain a third image by scaling the first image based on the scaling value having the second ratio, and the image analyzer is configured to analyze the third image based on the face classifier.

16. The face detection device of claim 12, wherein the detector comprises:

a scaler configured to scale the reference window of the face classifier, based on the scaling value having the first ratio to generate a scaled reference window of the face classifier; and an image analyzer configured to analyze the first image based on the scaled reference window of the face classifier.

17. The face detection device of claim 12, further comprising:

a distance measurement module configured to obtain first data corresponding to the distance information, wherein the calculator is configured to obtain the distance information based on the first data received from the distance measurement module.

18. An image pickup apparatus, comprising:

a lens configured to focus light reflected from an object to output focused light;

a sensor configured to obtain an image based on the focused light;

a motor configured to move the lens to thereby perform an autofocusing operation to focus the image when the image is obtained; and a data processor configured to detect, by changing a scaling value based on a first ratio, a face image in the image before the autofocusing operation is completed, wherein the data processor is configured to calculate an expected ratio which is a size ratio of an expected face size of the image to a reference window of a face classifier, and select, as the first ratio, a ratio among a plurality of ratios which is closest to the expected ratio.

19. The image pickup apparatus of claim 18, wherein the data processor is configured to further detect the face image based on a pseudo distance between the lens and the object.

20. The image pickup apparatus of claim 18, wherein the data processor is configured to determine the scaling value based on a pseudo distance, scale the image based on the scaling value to generate a scaled image, and further detect the face image based on the scaled image.

* * * * *